United States Patent
Edlund

(10) Patent No.: US 8,961,627 B2
(45) Date of Patent: Feb. 24, 2015

(54) HYDROGEN GENERATION ASSEMBLIES AND HYDROGEN PURIFICATION DEVICES

(76) Inventor: David J Edlund, Bend, OR (US)

(*) Notice: Subject to any disclaimer, the term of this patent is extended or adjusted under 35 U.S.C. 154(b) by 890 days.

(21) Appl. No.: 13/178,098

(22) Filed: Jul. 7, 2011

(65) Prior Publication Data
US 2013/0011301 A1    Jan. 10, 2013

(51) Int. Cl.
*C01B 3/36* (2006.01)
*C01B 6/24* (2006.01)
(Continued)

(52) U.S. Cl.
CPC .............. *B01J 8/0257* (2013.01); *C01B 3/384* (2013.01); *B01J 8/0278* (2013.01); *B01J 8/0285* (2013.01); *C01B 2203/0233* (2013.01); *C01B 2203/0283* (2013.01); *C01B 2203/0405* (2013.01); *C01B 2203/043* (2013.01); *C01B 2203/044* (2013.01); *C01B 2203/0445* (2013.01); *C01B 2203/047* (2013.01); *C01B 2203/066* (2013.01); *C01B 2203/0811* (2013.01); *C01B 2203/1217* (2013.01); *C01B 2203/1223* (2013.01); *C01B 2203/1241* (2013.01); *C01B 2203/1247* (2013.01); *C01B 2203/1288* (2013.01);
(Continued)

(58) Field of Classification Search
CPC ...... C01B 3/02; C01B 3/24; C01B 2203/0811
USPC .................................................. 48/61, 197 R
See application file for complete search history.

(56) References Cited

U.S. PATENT DOCUMENTS

| 3,154,920 A | 11/1964 | Nash et al. |
| 5,053,195 A | 10/1991 | MacKay |

(Continued)

FOREIGN PATENT DOCUMENTS

| DE | 69120740 T2 | 11/1996 |
| DE | 69219084 T2 | 7/1997 |

(Continued)

OTHER PUBLICATIONS

US Receiving Office, Written Opinion for PCT Application No. PCT/US12/45437, Nov. 19, 2012, 10 pages.

(Continued)

*Primary Examiner* — Matthew Merkling
(74) *Attorney, Agent, or Firm* — Kolisch Hartwell, PC

(57) ABSTRACT

Hydrogen generation assemblies, hydrogen purification devices, and their components, and methods of manufacturing those assemblies, devices, and components are disclosed. In some embodiments, the assemblies may include a vaporization region with packing material configured to transfer heat from a heated exhaust stream to a liquid-containing feed stream, and/or an insulation base adjacent a combustion region and configured to reduce external temperature of an enclosure. In some embodiments, the assemblies may include a cooling block configured to maintain an igniter assembly in thermal communication with a feed stream conduit, an igniter assembly including a catalytic coating, and/or a fuel stream distribution assembly. In some embodiments, the assemblies may include a heat conducting assembly configured to conduct heat from external heaters to an enclosure portion. In some embodiments, the devices may include frames with membrane support structures and/or may include a microscreen structure configured to prevent intermetallic diffusion.

8 Claims, 9 Drawing Sheets

(51) Int. Cl.
*C01B 3/02* (2006.01)
*C01B 3/24* (2006.01)
*B01J 8/02* (2006.01)
*C01B 3/38* (2006.01)

(52) U.S. Cl.
CPC .............. *C01B2203/1294* (2013.01); *B01J 2208/00203* (2013.01); *B01J 2208/00309* (2013.01); *B01J 2208/00504* (2013.01); *B01J 2208/00522* (2013.01); *B01J 2208/0053* (2013.01); *B01J 2219/00006* (2013.01); *B01J 2219/0004* (2013.01)
USPC ............ 48/61; 422/625; 423/644; 423/648.1; 423/650

(56) References Cited

U.S. PATENT DOCUMENTS

| | | | |
|---|---|---|---|
| 5,139,541 A | 8/1992 | Edlund | |
| 5,182,075 A | 1/1993 | Gotoh et al. | |
| 5,217,506 A | 6/1993 | Edlund et al. | |
| 5,259,870 A | 11/1993 | Edlund | |
| 5,266,283 A | 11/1993 | Friesen et al. | |
| 5,393,325 A | 2/1995 | Edlund | |
| 5,498,278 A | 3/1996 | Edlund | |
| 5,645,626 A | 7/1997 | Edlund et al. | |
| 5,861,137 A | 1/1999 | Edlund | |
| 5,888,273 A | 3/1999 | Buxbaum | |
| 5,904,754 A | 5/1999 | Juda et al. | |
| 5,997,594 A | 12/1999 | Edlund et al. | |
| 6,136,222 A | 10/2000 | Friesen et al. | |
| 6,152,995 A | 11/2000 | Edlund | |
| 6,168,650 B1 | 1/2001 | Buxbaum | |
| 6,171,574 B1 | 1/2001 | Juda et al. | |
| 6,183,543 B1 | 2/2001 | Buxbuam | |
| 6,189,568 B1 | 2/2001 | Bergum et al. | |
| 6,221,117 B1 | 4/2001 | Edlund et al. | |
| 6,319,306 B1 | 11/2001 | Edlund et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,465,118 B1 | 10/2002 | Dickman et al. | |
| 6,475,268 B2 | 11/2002 | Thornton | |
| 6,494,937 B1 | 12/2002 | Edlund et al. | |
| 6,495,277 B1 | 12/2002 | Edlund et al. | |
| 6,537,352 B2 | 3/2003 | Edlund et al. | |
| 6,547,858 B1 | 4/2003 | Edlund et al. | |
| 6,562,111 B2 | 5/2003 | Edlund et al. | |
| 6,569,227 B2 | 5/2003 | Edlund et al. | |
| 6,596,057 B2 | 7/2003 | Edlund et al. | |
| 6,632,270 B2 | 10/2003 | Edlund et al. | |
| 6,660,069 B2 | 12/2003 | Sato et al. | |
| 6,667,128 B2 | 12/2003 | Edlund | |
| 6,719,831 B2 | 4/2004 | Edlund et al. | |
| 6,719,832 B2 | 4/2004 | Edlund et al. | |
| 6,723,156 B2 | 4/2004 | Edlund et al. | |
| 6,767,389 B2 | 7/2004 | Edlund et al. | |
| 6,783,741 B2 | 8/2004 | Edlund et al. | |
| 6,811,908 B2 | 11/2004 | Edlund et al. | |
| 6,818,335 B2 | 11/2004 | Edlund et al. | |
| 6,824,593 B2 | 11/2004 | Edlund et al. | |
| 6,835,481 B2 | 12/2004 | Dickman et al. | |
| 6,858,341 B2 | 2/2005 | Edlund | |
| 6,869,707 B2 | 3/2005 | Edlund et al. | |
| 6,872,464 B2 | 3/2005 | Hubner et al. | |
| 6,878,474 B2 | 4/2005 | Dickman et al. | |
| 6,890,672 B2 | 5/2005 | Dickman et al. | |
| 6,896,709 B1 | 5/2005 | Han et al. | |
| 6,953,497 B2 | 10/2005 | Edlund et al. | |
| 6,979,507 B2 | 12/2005 | Edlund et al. | |
| 6,994,927 B2 | 2/2006 | Edlund et al. | |
| 7,005,113 B2 | 2/2006 | Edlund et al. | |
| 7,008,708 B2 | 3/2006 | Edlund et al. | |
| 7,029,515 B2 | 4/2006 | Krueger | |
| 7,052,530 B2 | 5/2006 | Edlund et al. | |
| 7,063,047 B2 | 6/2006 | Reinke et al. | |
| 7,101,421 B2 | 9/2006 | Edlund et al. | |
| 7,135,048 B1 | 11/2006 | Edlund et al. | |
| 7,147,677 B2 | 12/2006 | Edlund | |
| 7,182,917 B2 | 2/2007 | Krueger | |
| 7,195,663 B2 | 3/2007 | Edlund et al. | |
| 7,201,783 B2 | 4/2007 | Edlund | |
| 7,208,241 B2 | 4/2007 | Edlund et al. | |
| 7,250,231 B2 | 7/2007 | Edlund | |
| 7,258,946 B2 | 8/2007 | Edlund | |
| 7,297,183 B2 | 11/2007 | Edlund et al. | |
| 7,306,868 B2 | 12/2007 | Arthur | |
| 7,341,609 B2 | 3/2008 | DeVries | |
| 7,368,194 B2 | 5/2008 | Dickman et al. | |
| 7,368,195 B2 | 5/2008 | Edlund et al. | |
| 7,390,587 B2 | 6/2008 | Dickman et al. | |
| 7,410,531 B2 | 8/2008 | Edlund et al. | |
| 7,470,293 B2 | 12/2008 | Edlund et al. | |
| 7,476,455 B2 | 1/2009 | Edlund | |
| 7,485,381 B2 | 2/2009 | Dickman et al. | |
| 7,601,302 B2 | 10/2009 | Edlund et al. | |
| 7,632,321 B2 | 12/2009 | Edlund | |
| 7,632,322 B2 | 12/2009 | Edlund | |
| 7,659,019 B2 | 2/2010 | Edlund | |
| 7,682,718 B2 | 3/2010 | Dickman et al. | |
| 7,736,596 B2 | 6/2010 | Edlund et al. | |
| 7,771,882 B2 | 8/2010 | Edlund et al. | |
| 7,789,941 B2 | 9/2010 | Edlund et al. | |
| 7,819,955 B2 | 10/2010 | Edlund et al. | |
| 7,828,864 B2 | 11/2010 | Edlund et al. | |
| 7,846,569 B2 | 12/2010 | Edlund et al. | |
| 7,939,211 B2 | 5/2011 | Edlund et al. | |
| 7,977,000 B2 | 7/2011 | Edlund | |
| 7,981,172 B2 | 7/2011 | Edlund et al. | |
| 7,985,510 B2 | 7/2011 | Edlund et al. | |
| 8,021,446 B2 | 9/2011 | Adams et al. | |
| 8,038,748 B2 | 10/2011 | Edlund | |
| 8,057,575 B2 | 11/2011 | Edlund et al. | |
| 8,133,626 B2 | 3/2012 | Edlund et al. | |
| 2001/0045061 A1 | 11/2001 | Edlund et al. | |
| 2002/0071976 A1 | 6/2002 | Edlund | |
| 2002/0114984 A1 | 8/2002 | Edlund et al. | |
| 2003/0015096 A1 | 1/2003 | Sato et al. | |
| 2003/0087138 A1 | 5/2003 | Margiott et al. | |
| 2003/0167690 A1 | 9/2003 | Edlund et al. | |
| 2003/0192251 A1 | 10/2003 | Edlund et al. | |
| 2003/0223926 A1 | 12/2003 | Edlund et al. | |
| 2004/0065013 A1 | 4/2004 | DeVries | |
| 2004/0066043 A1 | 4/2004 | Maiwald et al. | |
| 2004/0081867 A1 | 4/2004 | Edlund | |
| 2004/0081868 A1 | 4/2004 | Edlund | |
| 2004/0197616 A1 | 10/2004 | Edlund et al. | |
| 2004/0229090 A1 | 11/2004 | Davis et al. | |
| 2005/0188616 A1 | 9/2005 | Bizjak et al. | |
| 2006/0037476 A1 | 2/2006 | Edlund et al. | |
| 2006/0051638 A1 | 3/2006 | Gross | |
| 2006/0090397 A1 | 5/2006 | Edlund et al. | |
| 2006/0112636 A1* | 6/2006 | Chellappa et al. | 48/61 |
| 2006/0127719 A1 | 6/2006 | Brantley et al. | |
| 2006/0144700 A1 | 7/2006 | Carson et al. | |
| 2006/0216562 A1 | 9/2006 | Edlund et al. | |
| 2006/0233700 A1* | 10/2006 | Chellappa et al. | 423/648.1 |
| 2007/0183968 A1 | 8/2007 | Healey et al. | |
| 2007/0190380 A1 | 8/2007 | DeVries | |
| 2007/0266631 A1 | 11/2007 | Pledger et al. | |
| 2007/0274904 A1 | 11/2007 | Popham et al. | |
| 2007/0292729 A1 | 12/2007 | Brantley et al. | |
| 2008/0029389 A1 | 2/2008 | Dreier et al. | |
| 2008/0075987 A1 | 3/2008 | Kindler et al. | |
| 2008/0085434 A1 | 4/2008 | Arthur | |
| 2008/0115669 A1 | 5/2008 | Edlund et al. | |
| 2008/0138677 A1 | 6/2008 | Edlund | |
| 2008/0138678 A1 | 6/2008 | Hill | |
| 2008/0176118 A1 | 7/2008 | Edlund et al. | |
| 2008/0187797 A1 | 8/2008 | Edlund | |
| 2008/0213638 A1* | 9/2008 | Brantley et al. | 429/19 |

(56) References Cited

U.S. PATENT DOCUMENTS

| | | |
|---|---|---|
| 2008/0222954 A1 | 9/2008 | Adams et al. |
| 2008/0230039 A1 | 9/2008 | Weiss et al. |
| 2009/0011310 A1 | 1/2009 | Trabold et al. |
| 2010/0064887 A1 | 3/2010 | Edlund et al. |
| 2010/0230079 A1 | 9/2010 | Byers et al. |
| 2010/0261074 A1 | 10/2010 | Edlund et al. |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |

FOREIGN PATENT DOCUMENTS

| | | |
|---|---|---|
| DE | 69730071 T2 | 8/2005 |
| DE | 60035418 T2 | 3/2008 |
| EP | 0570185 A3 | 11/1993 |
| EP | 0652042 A1 | 5/1995 |
| EP | 0718031 A1 | 6/1996 |
| EP | 0470822 B1 | 7/1996 |
| EP | 0546808 B1 | 4/1997 |
| EP | 0783919 A1 | 7/1997 |
| EP | 1010942 A3 | 2/2003 |
| EP | 0800852 B1 | 8/2004 |
| EP | 1272259 B1 | 10/2004 |
| EP | 1516663 A2 | 3/2005 |
| EP | 1135822 B1 | 4/2005 |
| EP | 1279431 B1 | 4/2005 |
| EP | 1523054 A2 | 4/2005 |
| EP | 1679111 A2 | 7/2006 |
| EP | 0951529 B1 | 8/2006 |
| EP | 1252678 B1 | 11/2006 |
| EP | 1189678 B1 | 7/2007 |
| EP | 1290747 B1 | 2/2009 |
| EP | 1138096 B1 | 10/2010 |
| EP | 2359928 A2 | 8/2011 |
| GB | 02355418 A | 4/2001 |
| GB | 2370241 A | 6/2002 |
| JP | 10052621 A | 2/1998 |
| JP | 2003277019 A | 10/2003 |
| JP | 2003282119 A | 10/2003 |
| JP | 2007099528 A | 4/2007 |
| JP | 2008171815 A | 7/2008 |
| JP | 2008285404 A | 11/2008 |
| TW | 200404739 | 4/2004 |
| TW | 200629635 | 8/2006 |
| TW | 200804177 | 1/2008 |
| WO | 8806489 A1 | 9/1988 |
| WO | 9919456 A1 | 4/1999 |
| WO | 0022690 A1 | 4/2000 |
| WO | 0056425 A1 | 9/2000 |
| WO | 0108247 A1 | 2/2001 |
| WO | 0112311 A1 | 2/2001 |
| WO | 0112539 A1 | 2/2001 |
| WO | 0126174 A1 | 4/2001 |
| WO | 0150541 A1 | 7/2001 |
| WO | 0150542 A1 | 7/2001 |
| WO | 0168514 A2 | 9/2001 |
| WO | 0170376 A1 | 9/2001 |
| WO | 0173879 A1 | 10/2001 |
| WO | 0193362 A1 | 12/2001 |
| WO | 0238265 A1 | 5/2002 |
| WO | 0249128 A2 | 6/2002 |
| WO | 02069428 A1 | 9/2002 |
| WO | 03002244 A1 | 1/2003 |
| WO | 03026776 A1 | 4/2003 |
| WO | 03041188 | 5/2003 |
| WO | 03077331 A2 | 9/2003 |
| WO | 03086964 A1 | 10/2003 |
| WO | 03089128 A1 | 10/2003 |
| WO | 03100900 A1 | 12/2003 |
| WO | 2004038845 A1 | 5/2004 |
| WO | 2004091005 A2 | 10/2004 |
| WO | 2005001955 A2 | 1/2005 |
| WO | 2005091785 A2 | 10/2005 |
| WO | 2005119824 A2 | 12/2005 |
| WO | 2006033773 A2 | 3/2006 |
| WO | 2006049918 A2 | 5/2006 |
| WO | 2006050335 A2 | 5/2006 |
| WO | 2006133003 A2 | 12/2006 |
| WO | 2007035467 A2 | 3/2007 |
| WO | 2007037856 A2 | 4/2007 |
| WO | 2007049130 A1 | 5/2007 |
| WO | 2008008279 A2 | 1/2008 |
| WO | 2008033301 A1 | 3/2008 |
| WO | 2008105770 A1 | 9/2008 |
| WO | 2009088962 A1 | 7/2009 |
| WO | 2010033628 A1 | 3/2010 |
| WO | 2010118221 A1 | 10/2010 |
| WO | 2011059446 A1 | 5/2011 |
| WO | 2012067612 A1 | 5/2012 |
| WO | 2012091121 | 7/2012 |

OTHER PUBLICATIONS

US Receiving Office, International Search Report for PCT Application No. PCT/us13/56908, Jan. 24, 2014, 2 pages.
US Receiving Office, Written Opinion for PCT Application No. PCT/US13/56908, Jan. 24, 2014, 22 pages.
US Receiving Office, International Search report for PCT Application No. PCT/US2014/019837, Jun. 6, 2014, 2 pages.
US Receiving Office, Written Opinion for PCT Application No. PCT/US2014/019837, Jun. 6, 2014, 11 pages.
U.S. Patent and Trademark Office, PCT Receiving Office, International Preliminary Report on Patentability for PCT Application No. PCT/US2012/045437, Jan. 7, 2014, 7 pages.
Taiwan Intellectual Property Office, Office Action for Taiwanese Application No. 101124209, Dec. 19, 2013, 32 pages.
U.S. Patent and Trademark Office, PCT Receiving Office, International Search Report for PCT Application No. PCT/US12/45437, Nov. 19, 2012, 6 pages.
"HGS-M Series Hydrogen Generator: Powering Fuel Cells from readily available Methanol", www.hy9.com, updated Jun. 20, 2011, 2 pages, Hopkinton, Massachusetts, USA.
Edlund, David, "Methanol Fuel Cell Systems: Advancing Towards Commercialization", 2011, 199 pages, Pan Stanford Publishing Pte. Ltd., Singapore.

* cited by examiner

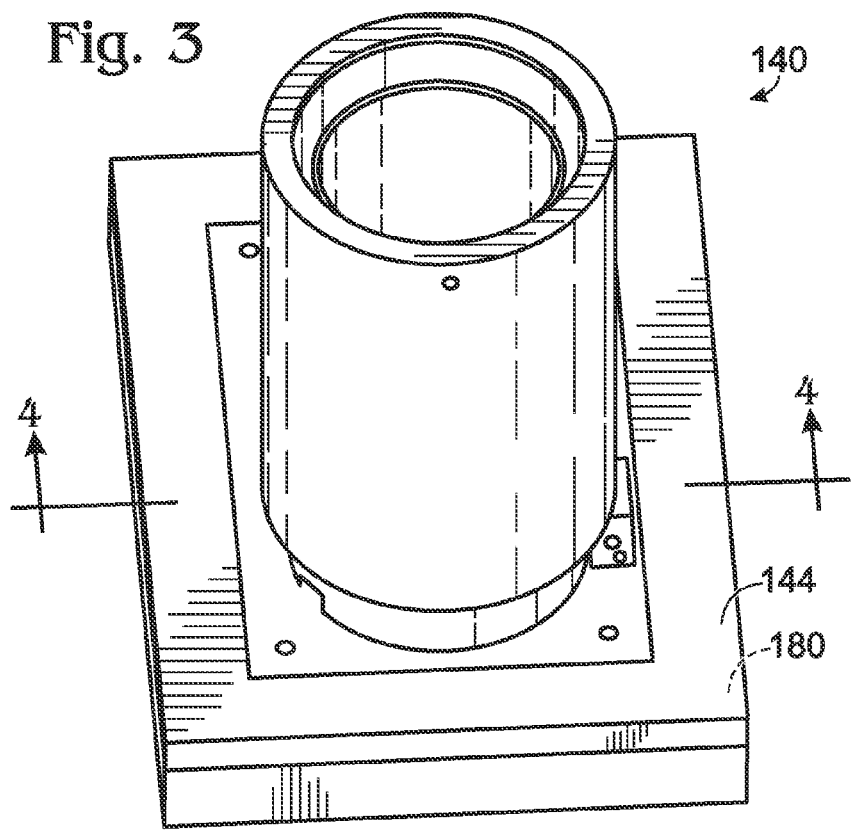

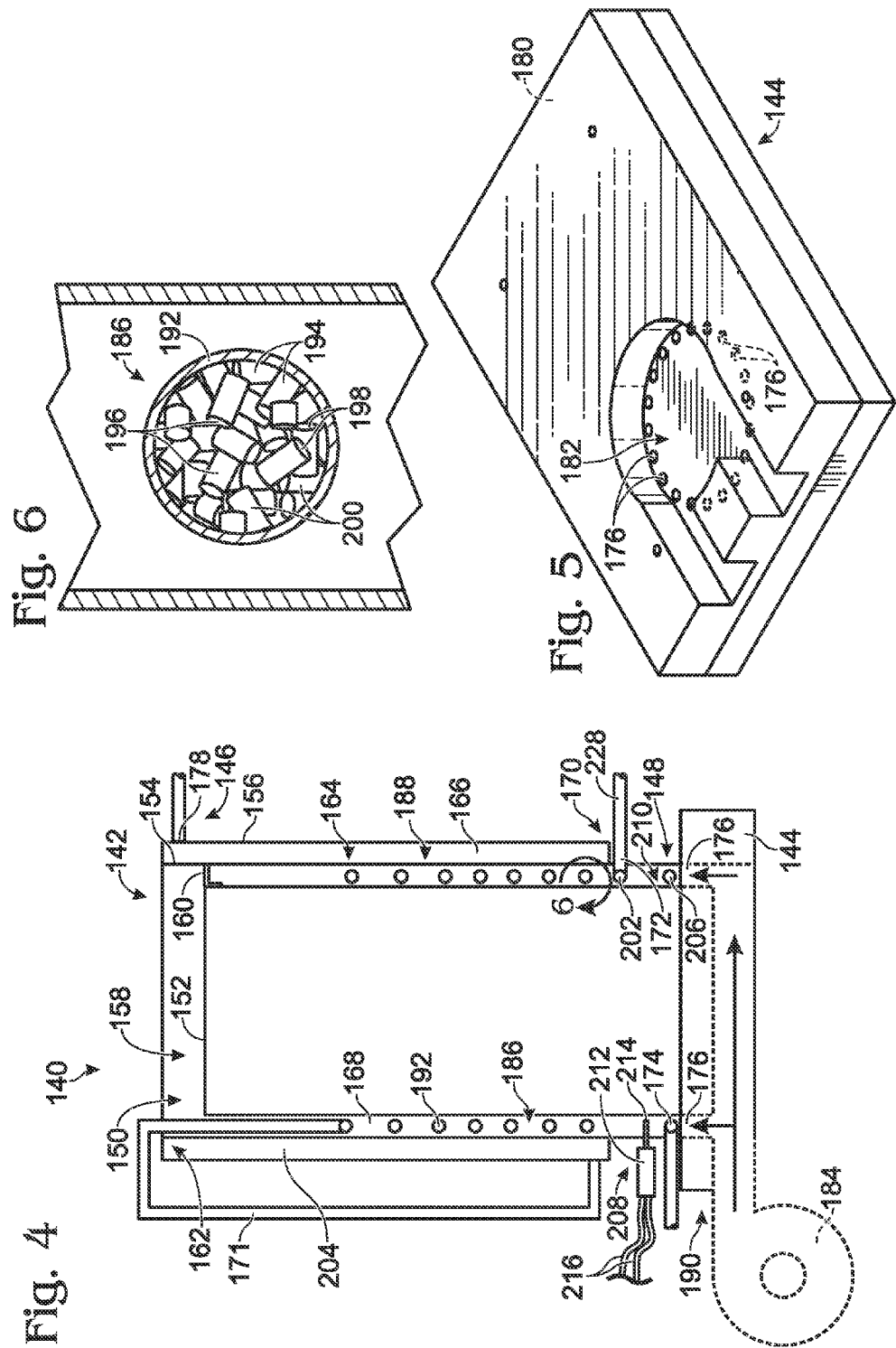

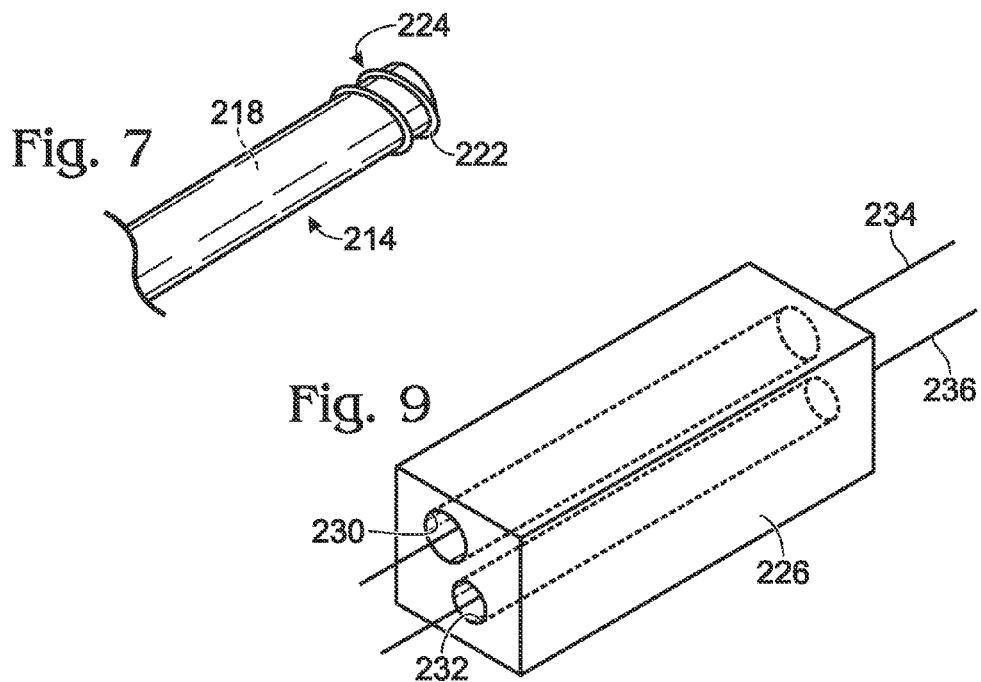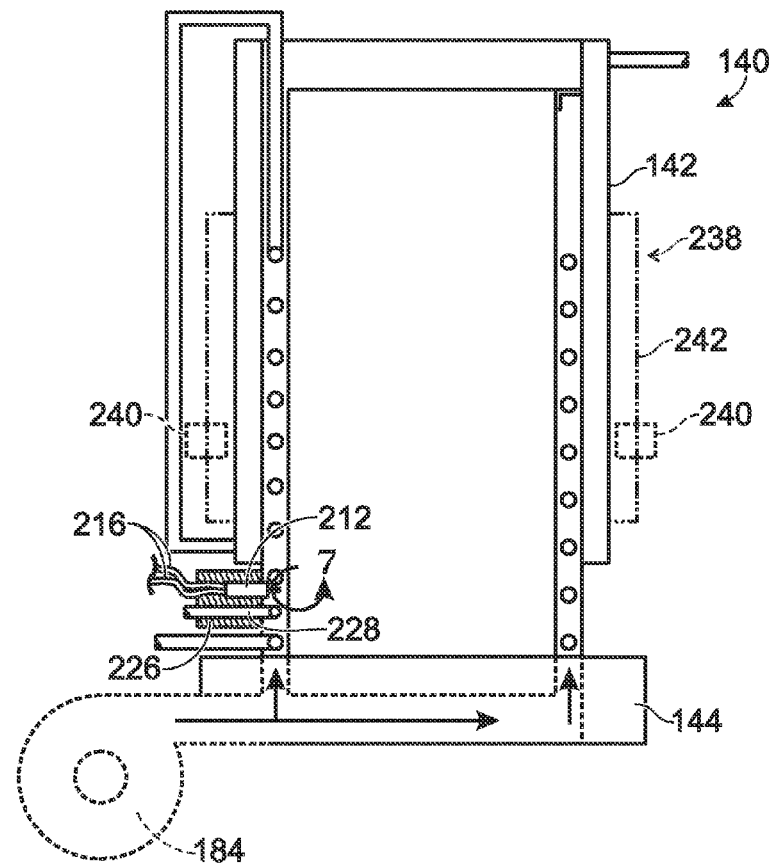

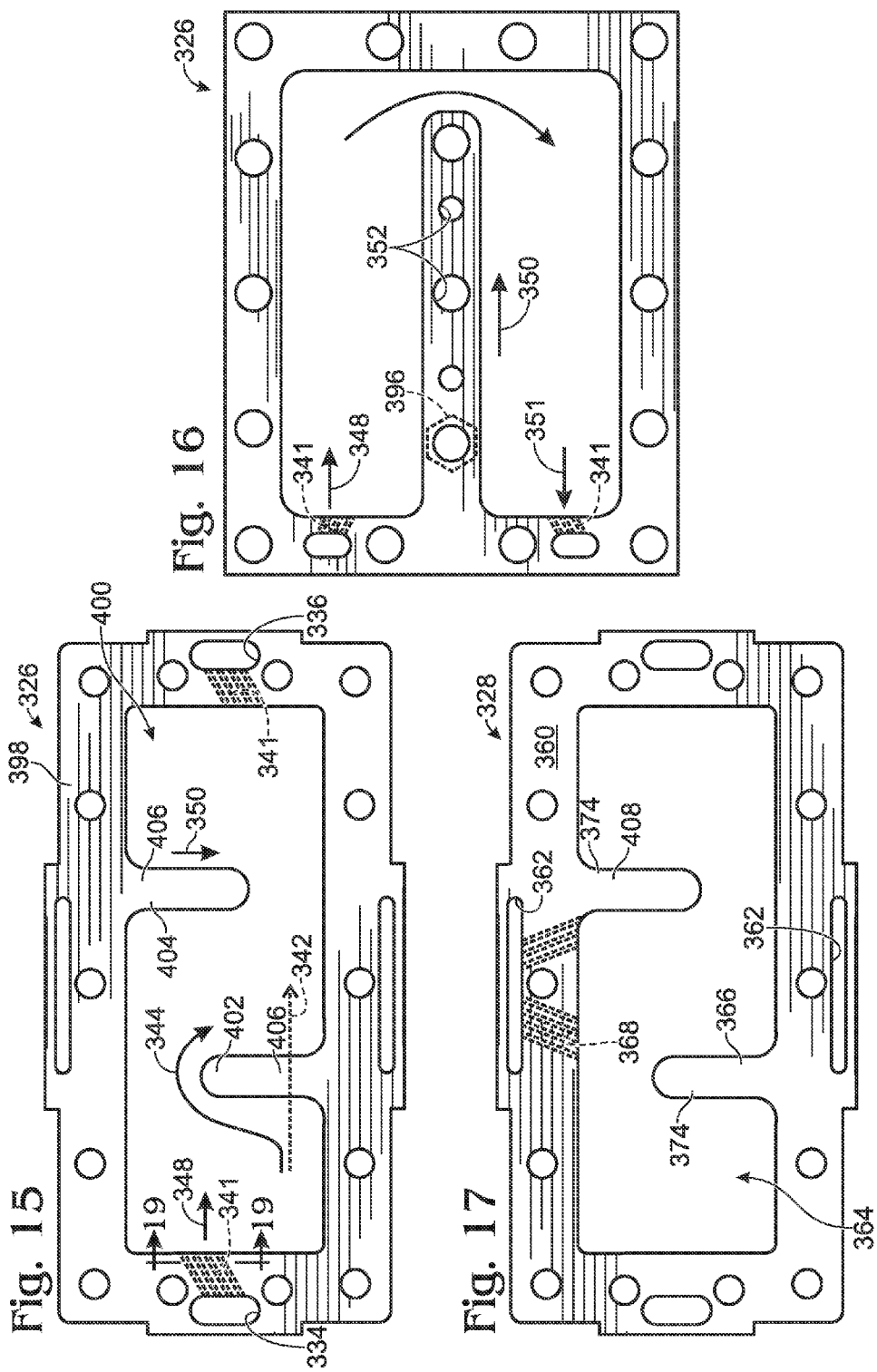

HYDROGEN GENERATION ASSEMBLIES AND HYDROGEN PURIFICATION DEVICES

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; and U.S. Patent Application Publication Nos. 2006/0090397; 2006/0272212; 2007/0266631; 2007/0274904; 2008/0085434; 2008/0138678; 2008/0230039; 2010/0064887. The complete disclosures of the above patents and patent application publications are hereby incorporated by reference for all purposes.

SUMMARY OF THE DISCLOSURE

Some embodiments provide a steam reforming hydrogen generation assembly configured to receive at least one liquid-containing feed stream that includes water and a carbon-containing feedstock and generate a reformate stream containing hydrogen gas as a majority component and other gases. In some embodiments, the hydrogen generation assembly may include a vaporization region configured to receive and vaporize at least a portion of the at least one liquid-containing feed stream to form a vapor feed stream, and a hydrogen-producing region containing a reforming catalyst and configured to receive the vapor feed stream and to produce the reformate stream via a steam reforming reaction. The hydrogen generation assembly may additionally include a heating assembly configured to produce a heated exhaust stream for heating the vaporization region to at least a minimum vaporization temperature. The vaporization region may include packing material configured to transfer heat from the heated exhaust stream to the at least one liquid-containing feed stream.

In some embodiments, the hydrogen generation assembly may include an enclosure, and a hydrogen-producing region contained within the enclosure and including a reforming catalyst. The hydrogen-producing region may be configured to produce, via a steam reforming reaction, the reformate stream from the at least one feed stream. The hydrogen-generation assembly may additionally include a heating assembly configured to receive at least one air stream and at least one fuel stream and to combust the at least one fuel stream within a combustion region contained within the enclosure producing a heated exhaust stream for heating at least the hydrogen-producing region to at least a minimum hydrogen-producing temperature. The hydrogen generation assembly may further include an insulation base configured to reduce external temperature of the enclosure, the insulation base being adjacent to the combustion region. The enclosure may be supported on the insulation base and the insulation base may include insulating material and at least one passage that extends through the insulating material. The at least one passage may be in fluid communication with the combustion region.

In some embodiments, the hydrogen generation assembly may include an enclosure, and a hydrogen-producing region contained within the enclosure and including a reforming catalyst and configured to receive the at least one feed stream and to produce the reformate stream via a steam reforming reaction. The hydrogen generation assembly may additionally include a feed stream conduit in fluid communication with the hydrogen-producing region and through which the at least one feed stream is passed prior to delivery to the hydrogen-producing region, and a heating assembly in thermal communication with the hydrogen-producing region. The heating assembly may include inlets for receiving at least one fuel stream and at least one air stream, and an igniter assembly configured to ignite the at least one fuel stream. The igniter assembly may include a body portion, at least one igniter element attached to the body portion, and wires in electrical communication with the at least one igniter element and at least partially enclosed by the body portion. The igniter assembly may additionally include a metal cooling block having at least first and second channels in thermal communication with each other. The first channel may receive at least part of the body portion and at least part of the wires, and the second channel may receive at least part of the feed stream conduit.

In some embodiments, the hydrogen generation assembly may include a hydrogen-producing region containing a reforming catalyst. The hydrogen-producing region may be configured to receive the at least one feed stream and to produce the reformate stream via a steam reforming reaction. The hydrogen generation assembly may additionally include a heating assembly in thermal communication with the hydrogen-producing region. The heating assembly may include an igniter assembly configured to ignite at least one fuel stream. The igniter assembly may include an igniter element having a catalytically active coating configured to combust hydrogen in the presence of oxygen.

In some embodiments, the hydrogen generation assembly may include an enclosure having a bottom portion and a hydrogen-producing region contained within the enclosure and including a reforming catalyst. The hydrogen-producing region may be configured to produce, via a steam reforming reaction, the reformate stream from the at least one feed stream. The hydrogen generation assembly may additionally include a heating assembly configured to receive at least one air stream and at least one fuel stream and to combust the at least one fuel stream within a combustion region contained within the enclosure producing a heated exhaust stream for heating at least the hydrogen-producing region to at least a minimum hydrogen-producing temperature. The hydrogen generation assembly may further include a fuel distribution assembly attached to the bottom portion of the enclosure. The fuel distribution assembly may be configured to distribute the at least one fuel stream into the combustion region. The fuel distribution may include a base including at least one passage that is in fluid communication with the combustion region, and a mesh assembly supported on the base. The fuel distribution assembly may additionally include a top wall having a perimeter, and at least one side wall having a top portion and a bottom portion. The top portion may be mounted around the perimeter and the bottom portion may be supported on the mesh assembly such that a fuel stream distribution region is formed within the at least one side wall and between the top wall and the mesh assembly. The fuel distribution assembly may further include an inlet into the fuel stream distribution region, and a fuel stream conduit fluidly connected to the inlet and configured to receive the at least one fuel stream. The mesh assembly may include at least one pathway for the at least one fuel stream to flow from the fuel stream distribution region to the combustion region.

In some embodiments, the hydrogen generation assembly may include an enclosure, and a hydrogen-producing region contained within the enclosure and including a reforming catalyst. The hydrogen-producing region may be configured to produce, via a steam reforming reaction, the reformate stream from the at least one feed stream. The hydrogen-generation assembly may additionally include a heat conducting assembly external to the enclosure and attached to at least a portion of the enclosure. The heat conducting assembly may be configured to conduct heat from one or more external heaters attached to the heat conducting assembly to the at least a portion of the enclosure.

Some embodiments provide a hydrogen purification device. In some embodiments, the hydrogen purification device may include first and second end frames. The first and second end frames may include an input port configured to receive a mixed gas stream containing hydrogen gas and other gases, and an output port configured to receive a permeate stream containing at least one of a greater concentration of hydrogen gas and a lower concentration of the other gases than the mixed gas stream. The first and second end frames may additionally include a byproduct port configured to receive a byproduct stream containing at least a substantial portion of the other gases. The hydrogen purification device may additionally include at least one hydrogen-selective membrane disposed between and secured to the first and second end frames. The at least one hydrogen-selective membrane may include a feed side and a permeate side. At least part of the permeate stream may be formed from the portion of the mixed gas stream that passes from the feed side to the permeate side, with the remaining portion of the mixed gas stream, which remains on the feed side, forming at least part of the byproduct stream. The hydrogen purification device further includes a plurality of frames disposed between at least one of the first and second end frames and the at least one hydrogen-selective membrane. Each frame of the plurality of frames may include a perimeter shell defining an open region and a frame plane. Each frame may additionally include at least a first membrane support structure extending into the open region. Each of the at least a first membrane support structure may be co-planar, within a first membrane support plane, with other first membrane support structures of the plurality of frames. The first membrane support plane may be perpendicular to the frame plane of each frame of the plurality of frames.

In some embodiments, the hydrogen purification device may include first and second end plates. The first and second end plates may include an input port configured to receive a mixed gas stream containing hydrogen gas and other gases, and an output port configured to receive a permeate stream containing at least one of a greater concentration of hydrogen gas and a lower concentration of the other gases than the mixed gas stream. The first and second end plates may additionally include a byproduct port configured to receive a byproduct stream containing at least a substantial portion of the other gases. The hydrogen purification device may additionally include at least one hydrogen-selective membrane disposed between the first and second end plates. The at least one hydrogen-selective membrane having a feed side and a permeate side. At least part of the permeate stream may be formed from the portion of the mixed gas stream that passes from the feed side to the permeate side, with the remaining portion of the mixed gas stream, which remains on the feed side, forming at least part of the byproduct stream. The hydrogen purification device may further include a microscreen structure configured to support the at least one hydrogen-selective membrane. The microscreen structure may include generally opposed surfaces configured to provide support to the permeate side, and a plurality of fluid passages extending between the opposed surfaces. The microscreen structure may include stainless steel containing an aluminum oxide layer configured to prevent intermetallic diffusion between the stainless steel and the at least one hydrogen-selective membrane.

Some embodiments provide a method of manufacturing a frame for a hydrogen purification device. The frame may be disposed between and secured to at least one of first and second end frames. The method may include plating first and second sections of the frame with at least one layering metal having a melting point, and joining the first and second sections. The method may additionally include raising the temperature of the joined first and second sections above the melting point, and allowing the at least one layering metal to diffuse into the first and second sections such that an alloy is formed. The alloy may have a melting point that is higher than the melting point of the at least one layering metal.

BRIEF DESCRIPTION OF THE DRAWINGS

FIG. 3 is an isometric view of a further example of a hydrogen generation assembly.

FIG. 4 is a sectional view of the hydrogen generation assembly of FIG. 3 taken along lines 4-4 on FIG. 3.

FIG. 5 is a partial bottom isometric view of an insulation base of the hydrogen generation assembly of FIG. 3.

FIG. 6 is a partial view of a vaporizer coil of the hydrogen generation assembly of FIG. 4.

FIG. 7 is a partial isometric view of a catalytic igniter of the hydrogen generation assembly of FIG. 3.

FIG. 8 is a sectional view of the hydrogen generation assembly of FIG. 3 taken along lines 4-4 on FIG. 3, showing feed stream and fuel stream conduits on the same side of the assembly, and an igniter assembly and a cooling block on that side.

FIG. 9 is an isometric view of the cooling block of FIG. 8.

FIG. 15 is a top view of an example of a feed frame of the hydrogen purification device of FIG. 13.

FIG. 16 is a top view of another example of a feed frame of the hydrogen purification device of FIG. 13.

FIG. 17 is a top view of an example of a permeate frame of the hydrogen purification device of FIG. 13.

DETAILED DESCRIPTION OF THE DISCLOSURE

Figure 1:
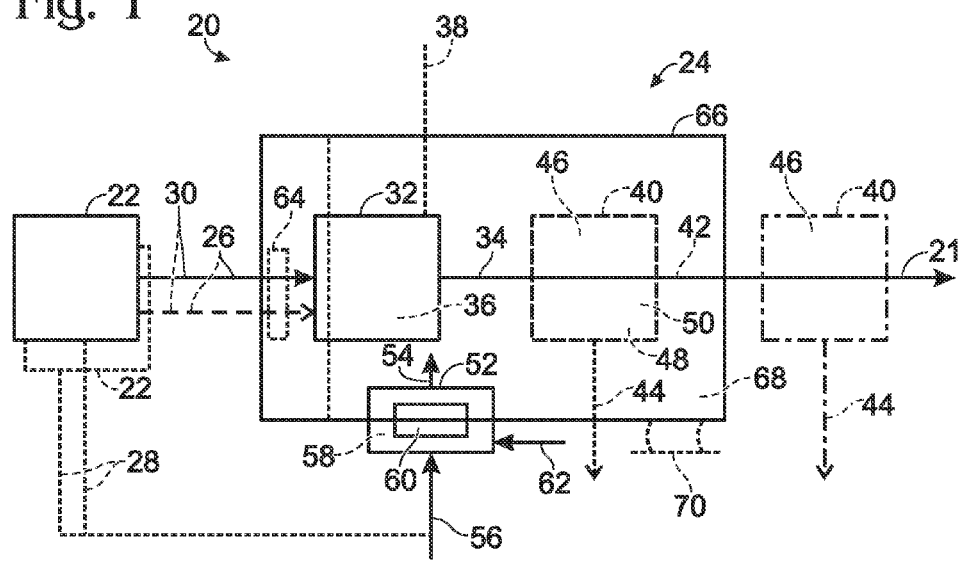
FIG. 1 is a schematic view of an example of a hydrogen generation assembly.

FIG. 1 shows an example of a hydrogen generation assembly 20. Unless specifically excluded hydrogen generation assembly may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (31 volume % water, 69 volume % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilize steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both of the streams may be liquid streams, while in other embodiments both of the streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the deliver of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 weight % hydrogen gas, 15-25 weight % hydrogen gas, 20-30 weight % hydrogen gas, at least 10 or 15 weight % hydrogen gas, at least 20 weight % hydrogen gas, etc.

Purification region 40 may include any suitable structure configured to reduce the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or difference mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weigh % to 45 weight % copper. A palladium-copper alloy that contains approximately 40 weight % copper has proven particularly effective, although other relative concentrations and components may be used. Another especially effective alloy is palladium with 2 weight % to 10 weight % gold, especially palladium with 5 weight % gold. When palladium and palladium alloys are used, hydrogen-selective membranes 46 may sometimes be referred to as "foils."

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide into carbon dioxide, and methanation catalyst regions (or beds) that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid and/or gas that is suitable for being consumed by heating assembly 52 to provide the desired heat output. Some fuel streams may be gases when delivered and combusted by heating assembly 52, while other may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. In embodiments of hydrogen generation assembly 20 that include a temperature modulating assembly in the form of a cooling assembly instead of a heating assembly (such as may be used when an exothermic hydrogen-generating process is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221,117, the complete disclosures of which are hereby incorporated by reference for all purposes.

Figure 2:
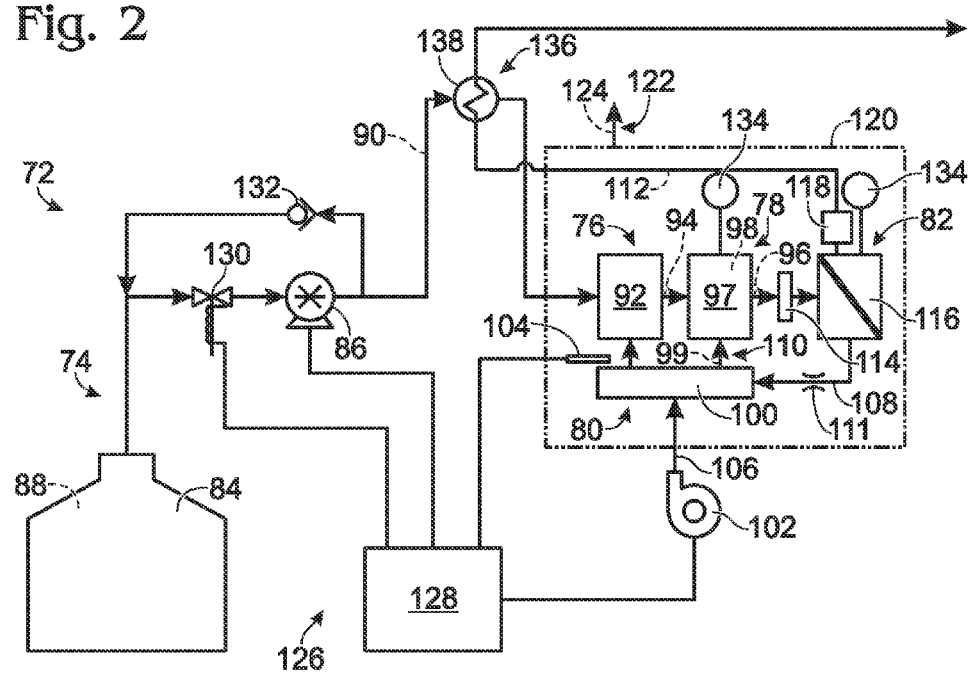
FIG. 2 is a schematic view of another example of a hydrogen generation assembly.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one of more feed streams, such as vapor feed stream(s) 94 from the vaporization region, to produce one or more output streams 96 containing hydrogen gas as a majority component and other gases. The hydrogen-producing region may product the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature (s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116. The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control assembly 126, which may include any suitable structure configured to control operation of hydrogen generation assembly 72. For example, control assembly 126 may include a control system 128, at least one valve 130, at least one pressure relief valve 132, and one or more temperature measurement devices 134. Control system 128 may detect temperatures within the hydrogen-producing region and/or purification regions via the temperature measurement device 134, which may include one or more thermocouples and/or other suitable devices. Based on the detected temperatures, the control system and/or an operator of the control system may adjust delivery of feed stream 90 to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Another example of hydrogen generation assembly 20 is generally indicated at 140 in FIGS. 3-4. Unless specifically excluded, hydrogen generation assembly 140 may include one or more components of other hydrogen generation assemblies described in this disclosure. Hydrogen generation assembly 140 may include an enclosure or shell 142 and an insulation base 144. The shell may include a top portion 146 and a bottom portion 148. Shell 142 may include a plurality of cylinders or tubes 150. For example, cylinders 150 may include an inner cylinder or tube 152, an intermediate cylinder or tube 154, and an outer cylinder or tube 156, as shown in FIG. 4. Cylinders 152, 154, and 156 may be of any suitable diameters and locations. For example, cylinders 152, 154, and 156 may be of successively larger diameter and/or may be arranged in concentric and/or eccentric relation to one another. Additionally, inner cylinder 152 may be mounted to create an offset region 158 in intermediate cylinder 154 via one or more suitable mounts 160 (one of those mounts is shown in FIG. 4). Intermediate cylinder 154 may be mounted on an end portion 162 of outer cylinder 156. Cylinders 150 may form a plurality of annular regions 164, which may include an outer annular region 166 and an inner annular region 168, as shown in FIG. 4.

Shell 142 also may include a plurality of ports 170, such as feed stream port(s) or inlet(s) 172, fuel stream port(s) or inlet(s) 174, air stream port(s) or inlet(s) 176, and reformate stream port(s) or outlet(s) 178, as shown in FIG. 4. Feed stream port 172 may be configured to receive one or more feed streams, such as one or more liquid-containing feed streams, from a feedstock delivery system and/or other suitable system into inner annular region 168. Fuel stream port 174 may be configured to receive one or more fuel streams into inner annular region 168. Air stream port 176 may be configured to receive one or more air streams into inner annular region 168. Reformate stream port 178 may be configured to receive one or more reformate streams from outer annular region 166.

The shell may be mounted on and/or supported on the insulation base. For example, the shell may be mounted on the insulation base such that the insulation base is adjacent bottom portion 148 and is spaced from top portion 146. The insulation base may be configured to reduce external temperature of the enclosure. For example, insulation base 144 may be adjacent to the combustion region of hydrogen generation assembly 140, as further discussed below. Insulation base 144 may include insulating material 180 and passages or air stream port(s) 176 that extend through the insulating material. The passages may be in fluid communication with the combustion region to allow delivery of one or more air streams to the combustion region. Passages 176 may be arranged in any suitable manner or in any suitable pattern(s). For example, passages 176 may be arranged in curvilinear and/or circular pattern(s), as shown in FIG. 5. Shell 144 also may include at least one cavity 182 within insulating material 180. The cavity(ies) may be in fluid communication with the passages and/or may be sized to at least partially receive one or more air blowers 184 that are configured to produce at least a portion of the air stream(s) that may be forced into the combustion region from below the burner assembly.

Hydrogen generation assembly 140 also may include a vaporization region 186, a hydrogen-producing region 188, and a heating assembly 190, as shown in FIG. 4. In some embodiments, hydrogen generation assembly 140 may include a purification region or hydrogen purification device (not shown). Vaporization region 186 may be at least substantially contained and/or located within inner annular region 168 and may be fluidly connected to outer annular region 166 via inter-annular conduit 171. Thus, vaporization region 186 may be referred to as being at least substantially contained within enclosure 142. The vaporization region may include any suitable structure configured to receive and vaporize at least a portion of at least one liquid-containing feed stream received by feed stream port(s) 172 to a vaporized feed stream. For example, vaporization region 186 may include tubing 192 that may be disposed between heating assembly 190 and hydrogen-producing region 188. Tubing 192 may include any suitable materials, such as stainless steel. Additionally, the tube may have a sinusoidal or other laterally-extending path that increases the heat transfer effect or the amount of time that the feed stream is heated by a heated exhausted stream generated by heating assembly 190. For example, tubing 190 may wrap around inner cylinder 152, as shown in FIG. 4. Tubing 190 may have any suitable shape(s), orientation(s), length(s), cross-sectional area(s), relative position(s) to the hydrogen-producing region and/or heating assembly, number of paths, etc. When vaporization region 186 includes tubing 192, the vaporization region may be referred to as a "tube vaporizer."

Vaporization region 186 also may include packing material 194, as shown in FIG. 6. The packing material may include any suitable structure configured to transfer heat from heated exhaust stream(s) of heating assembly 190 to the liquid-containing feed stream(s) and/or to provide a plurality of nucleation sites 196 to promote vaporization of at least a portion of the liquid-containing feed stream(s). The packing material may be contained within at least a portion of tubing 192 and/or may provide increased surface area within the tubing and/or a tortuous path for the liquid-containing feed stream, which may increase heat transfer and promote vaporization or boiling of the liquid-containing feed stream. For example, the packing material may include a plurality of irregular surfaces 198, such as sharp edges, cavities, and/or other surface imperfections that provide increased surface roughness. The irregular surface may provide at least a portion of the plurality of nucleation sites. The packing material also may store heat in the vaporization region, which may promote partial to complete vaporization of the liquid-containing feed stream(s) during startup of the hydrogen generation assembly.

In some embodiments, packing material 194 may include a plurality of metallic rods 200 configured to transfer heat from the heated exhaust stream of heating assembly 190 to the at least one liquid-containing feed stream, as shown in FIG. 6. The metallic rods may be any suitable dimensions sized to fit within tubing 192. For example, metallic rods 200 may include portions of wire, such as copper, aluminum, iron, and/or steel wire. Those portions of wire may be in short lengths, such as the diameter(s) to a few multiples of the diameter(s) of the wire portions. Alternatively, packing material 194 may include beads composed of glass, metal, and/or ceramic.

Vaporization region 186 also may include one or more retainers 202 configured to retain packing material 194 in tubing 192, as shown in FIG. 4. For example, retainers 202 may include wool (not shown), such as copper or stainless steel wool, positioned at end portions of tubing 192. Alternatively, or additionally, retainers 202 may include one or more constrictions (not shown) in the end portions of tubing 192.

Hydrogen-producing region 188 of hydrogen generation assembly 140 may include any suitable structure configured to receive at least one feed stream, such as at least one feed stream from vaporization region 186, and to produce a hydrogen-rich stream (such as a reformate stream) containing hydrogen gas as a majority component and other gases. For example, hydrogen-producing region 188 may include a reforming catalyst 204 configured to produce, from the feed stream(s), reformate stream(s) via a steam reforming reaction. Any suitable reforming catalyst(s) may be used. In some embodiments, hydrogen-producing region 188 may be at least substantially contained and/or located within outer annular region 166. In those embodiments, the hydrogen-producing region may be referred to as being at least substantially contained within enclosure 142.

Heating assembly 190 may include any suitable structure configured to produce at least one heated exhaust stream for heating one or more other components of the hydrogen generation assembly. For example, the heated exhaust stream may heat at least the hydrogen-producing region to at least a minimum hydrogen-producing temperature. Additionally, or alternatively, the heated exhaust stream may heat at least the vaporization region to at least a minimum vaporization temperature. Heating assembly 190 may thus be referred to as being in thermal communication with one or more other components of the hydrogen generation assembly, such as hydrogen-producing region 188 and/or vaporization region 186.

Heating assembly 190 may include a burner assembly 206 and an igniter assembly 208. The burner assembly may include any suitable structure configured to receive at least one fuel stream from fuel stream port(s) 174 and at least one air stream from air stream port(s) 176 and combust the fuel stream in the presence of the air stream to produce at least one heated exhaust stream. The combustion of the fuel stream may occur within a combustion region 210, which may be located in any suitable portion(s) of the hydrogen generation assembly, such as within inner annular region 168. Burner assembly may include a fuel stream conduit (not shown) that wraps at least partially around inner cylinder 152 and having a plurality of apertures (not shown) to distribute the fuel stream received from the fuel stream port into a plurality of fuel streams. The plurality of fuel streams from those apertures mix with the air stream(s) that air blower(s) 184 discharge into inner annular region 168 to create a combustible mixture of fuel and air.

Igniter assembly 208 may include any suitable structure configured to ignite the fuel stream(s) in the presence of air (and/or ignite the combustible mixture of fuel and air). For example, the igniter assembly may include a body portion 212 and at least one igniter element 214, as shown in FIG. 4. Igniter element 214 may be attached to the body portion and may include any suitable type of igniter element. For example, igniter element 214 may be an electrical igniter and/or any other types of igniters described in this disclosure.

Igniter assembly 208 also may include wires 216 that may be in electrical communication with the igniter element and/or may be at least partially enclosed by body portion 212, such as when the igniter element 214 is an electrical igniter. Wires 216 may connect the igniter element to an electrical source, such as an electrical outlet and/or one or more batteries.

Alternatively, or additionally, igniter element 214 may have a catalytically active coating 218 configured to combust fuel (such as hydrogen containing fuel) in the presence of air or oxygen, as shown in FIG. 7. Coating 218 may include any of (or any combination of) the platinum group metals (i.e., ruthenium, rhodium, palladium, osmium, iridium, and platinum) and/or any other suitable catalytically active coating(s) configured to combust fuel in the presence of air or oxygen. For example, coating 218 may include platinum or platinum mixed with rhodium. The coating may be a mixture of two or more platinum group metals and/or other coatings. Igniter element 214 may be made of any suitable materials, such as ceramic(s) and/or metal(s), with suitable porosity and surface roughness. Additionally, the igniter element may include a surface area of one square meter per gram, or more preferably 5-10 square meters per gram. Coating 218 may be about 0.1% to about 5% of the total weight of the igniter element.

In some embodiments, igniter assembly 208 may include at least one electrical wire 222 in electrical communication with an electrical power source and attached to the igniter element. The wire may be configured to cause localized heating to facilitate ignition of the fuel stream(s), particularly in colder operating temperatures and/or in the presence of impurities, such as carbon monoxide, which may raise ignition temperature of coating 218. Wire 222 may, for example, be wrapped around at least part of igniter element 214, such as around an end portion 224 of the igniter element. Any suitable wire may be used for wire 222, such as nickel-chromium wire.

In embodiments where igniter assembly 208 includes at least one electrical igniter element 214, heating assembly 190 also may include a cooling block 226, such as a metal cooling block, as shown in FIGS. 8-9. The cooling block may include any suitable structure configured to bring one or more components of igniter assembly 208 in thermal communication with a feed stream conduit 228 through which at least one liquid-containing feed stream is passed prior to delivery to the vaporization and/or hydrogen-producing regions (the feed stream conduit may be referred to as being in fluid communication with one or both of those regions). Bringing those components in thermal communication with the feed stream conduit may, for example, cool the components and prevent those components from overheating and/or failing. For example, when wires 216 are copper wires, cooling those wires may prevent them from oxidization and/or failure caused by overheating.

Cooling block 226 may include a first channel 230 and a second channel 232 in thermal communication with each other. The first channel may receive at least part of body portion 212 and/or at least part of wires 216. Second channel 232 may receive at least part of feed stream conduit 228. First and second channels 230 and 232 may extend along long axes 234 and 236, respectively. The first and second channels may be positioned in any suitable relationship to each other. For example, the first and second channels may be positioned such that long axes 234 and 236 are parallel to each other. Cooling block 226 may include any suitable cross-section transverse to long axes 234 and 236 of the first and second channels, respectively, as shown in FIG. 9. For example, cooling block 226 may include a rectangular, circular, and/or square cross-section. A cooling block 226 with a square cross-section is shown in FIG. 9.

Figure 10:
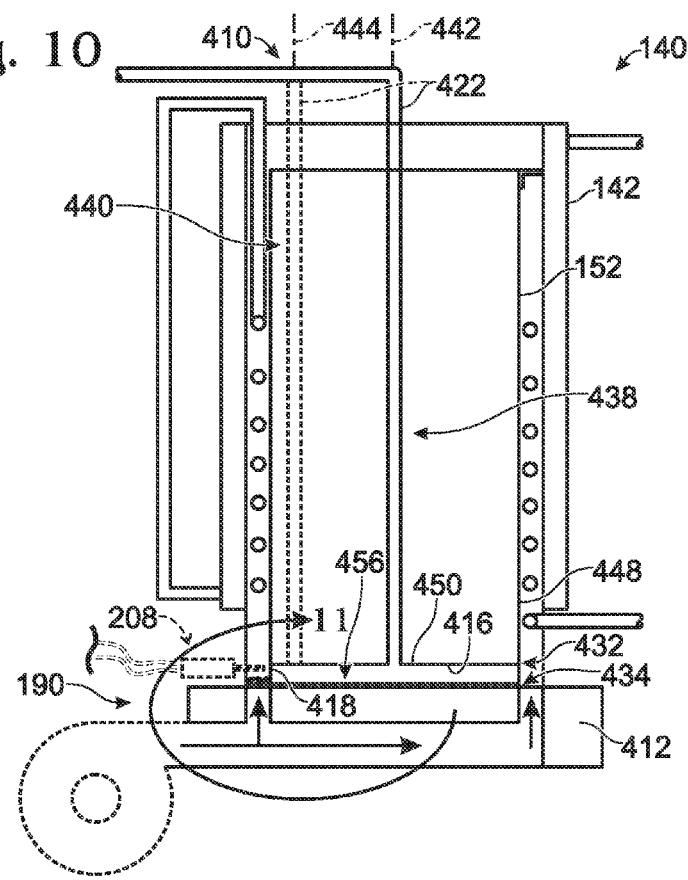
FIG. 10 is a sectional view of the hydrogen generation assembly of FIG. 3 taken along lines 4-4 on FIG. 3, showing a fuel distribution assembly.
Figure 11:
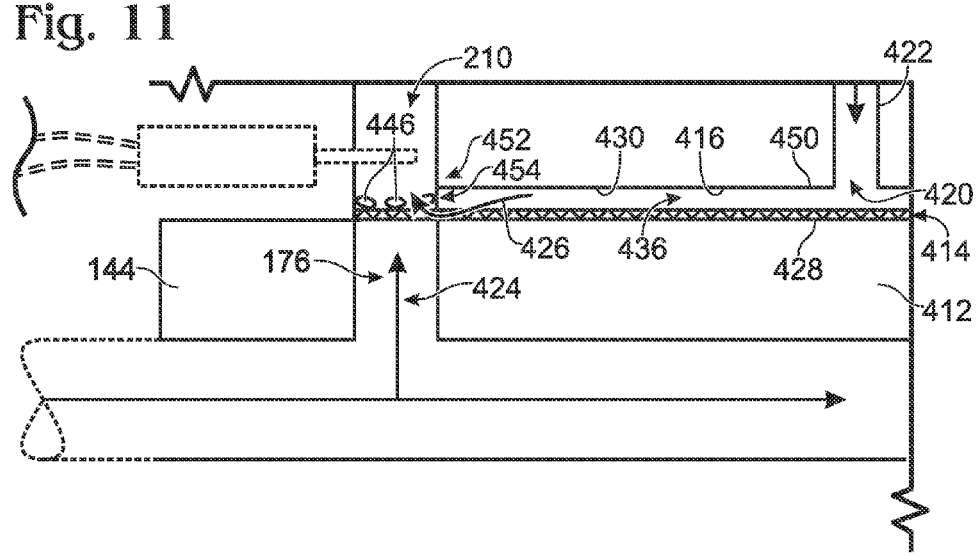
FIG. 11 is a partial view of the hydrogen generation assembly of FIG. 10.

In some embodiments, hydrogen generating assembly 140 may include a fuel distribution assembly 410, which may include any suitable structure configured to distribute at least one fuel stream into combustion region 210, as shown in FIGS. 10-11. The fuel distribution assembly may be positioned in any suitable locations, such as attached to or at least partially formed with the bottom portion of the enclosure. Fuel distribution assembly 410 may include a base 412, a mesh assembly 414, a top wall 416, at least one side wall 418, at least one inlet 420, and at least one fuel stream conduit 422, as shown in FIGS. 10-11. Base 412 may include any suitable structure configured to support the enclosure and the fuel distribution assembly, and/or to provide one or more passages in fluid communication with the combustion region. For example, base 412 may include at least one passage 424 that is in fluid communication with the combustion region. In some embodiments, base 412 may include structure similar to insulation base 144 having a plurality of air stream ports 176 in fluid communication with combustion region 210 as described above.

Mesh assembly 414 may include any suitable structure configured to provide one or more pathways 426 for at least one fuel stream to flow to the combustion region, as shown in FIG. 11. For example, the mesh assembly may include one or more layers of mesh 428, such as medium-sized steel woven mesh (or screen) in the range of about 6 to about 40 mesh. The mesh may include any suitable type(s) of steel, such as carbon steel and stainless steel. Mesh 428 may be supported on base 412 and sized to fit over passage(s) 424 such that the mesh extends into the combustion region. The mesh also may be size to fit over at least a substantial portion of the base. Mesh 428 may sometimes be referred to as "fuel gas dispersion mesh 428." Although mesh assembly 414 is shown to include a single layer of mesh 428, the mesh assembly may include two, three, four, five, or more layers of the mesh.

Top wall 416 may include any suitable shape(s) and may include a perimeter 430. For example, the top wall may be circular, rectangular, or square. In some embodiments, the top wall may be formed with the enclosure or be part of the bottom portion of the enclosure. Side wall(s) 418 may include a top portion 432 and a bottom portion 434. Top portion 432 may be mounted or attached around perimeter 430 of top wall 416. In some embodiments, the side wall(s) may be formed with the top wall and/or with the enclosure (or be part of the bottom portion of the enclosure). In other words, at least a part of the bottom portion of the enclosure may also be the top wall and/or sidewall(s) of the fuel distribution assembly. Bottom portion 434 may be supported on the mesh assembly. Sidewall(s) 418 may be any suitable length to allow fuel stream to flow to the combustion region, such as about 0.2 to about 0.25 inches. A fuel stream distribution region (or fuel gas plenum) 436 may be formed within sidewall(s) 418 and between top wall 416 and mesh assembly 414.

When enclosure 142 includes inner cylinder 152 with a circular sidewall 448, the inner cylinder may include a bottom plate 450 mounted to (such as via welding) or formed with the inner cylinder adjacent an end portion 452 of the inner cylinder such that bottom plate may be top wall 416, and an end portion 454 of circular sidewall 448 may be sidewall 418 forming a cavity 456 in the bottom portion of the enclosure, as shown in FIGS. 10-11. Although top wall 416 and sidewall(s) 418 are shown to be at least partially formed from enclosure 142, the top and/or sidewall(s) may be discrete elements mounted and/or attached to the enclosure.

The fuel distribution region may include one or more inlets 420, which may be formed on top wall 416 and/or sidewall(s) 418. Fuel stream conduit(s) 422 may be fluidly connected to the inlet and configured to receive at least one fuel stream and to transport the at least one fuel stream to the fuel distribution region. In some embodiments, the fuel stream conduit may go through any suitable portion(s) of enclosure 142. For example, fuel stream conduit(s) 422 may go through a central (or inner) portion 438 of the enclosure, as shown in solid lines in FIG. 10, and/or one or more side (or outer) portions 440, as shown in dashed lines in FIG. 10. When enclosure 142 defines and/or includes a longitudinal axis 442, the fuel stream conduits may extend along the longitudinal axis, as shown in solid lines in FIG. 10, and/or an axis 444 that is parallel to but spaced from the longitudinal axis, as shown in dashed lines in FIG. 10.

When hydrogen generation assembly 140 includes a fuel distribution assembly 410, heating assembly 190 may include at least one combustion catalyst 446 configured to combust hydrogen in the presence of oxygen, as shown in FIGS. 10-11. The combustion catalyst may be supported within the combustion region via the mesh assembly. For example, combustion catalyst 446 may be supported or disposed on mesh assembly 414 (such as on a top layer of mesh 428 of the mesh assembly). The combustion catalyst may be used instead of, or in addition to, igniter assembly 208 and/or other ignition sources described above. For example, an electrical ignition source (such as one or more of the igniter assemblies described above) and combustion catalyst 446 may be provided as redundant ignition sources. Combustion catalyst 446 may include any suitable catalyst, such as platinum, platinum-rhodium alloy, and palladium. The combustion catalyst may be granular allowing the catalyst to be, for example, sprinkled or poured on the mesh assembly.

In some embodiments, hydrogen generating assembly 140 may include a heat conducting assembly or heat distributing assembly 238, as shown in dashed lines in FIG. 8. The heat conducting assembly may be external to enclosure 142 and be attached to at least a portion of the enclosure. Heating conducting assembly may include any suitable structure configured to conduct and/or distribute heat from one or more external heaters 240 (such as cartridge heaters) to at least a portion of the enclosure and to one or more annular regions of the shell. The external heaters may be used to assist in start-up of the hydrogen-generation assembly and/or to facilitate hydrogen generation by raising temperature in the hydrogen producing and/or vaporization regions. The heat conducting assembly may be referred to as distributing heat from the external heaters to a larger surface area of the enclosure. For example, the external heaters may have a total heating surface area that is less or substantially less than a heated surface area of the portion of the enclosure that is heated by the heat conducting assembly.

Heat conducting assembly 238 may include a metal band 242 attached to at least a portion of the enclosure, such as partially or completely around at least a portion of the enclosure. Any suitable portions of the enclosure may be covered by the metal band. For example, the bottom quarter or third of the enclosure may be covered by the metal band. Metal band 242 may be made of any suitable thermally-conductive materials, such as aluminum, copper, and/or brass. External heaters 240 may be attached to metal band 242 via any suitable means, such as via any suitable fasteners and/or by drilling holes in metal band 242 to receive the external heaters.

Figure 12:
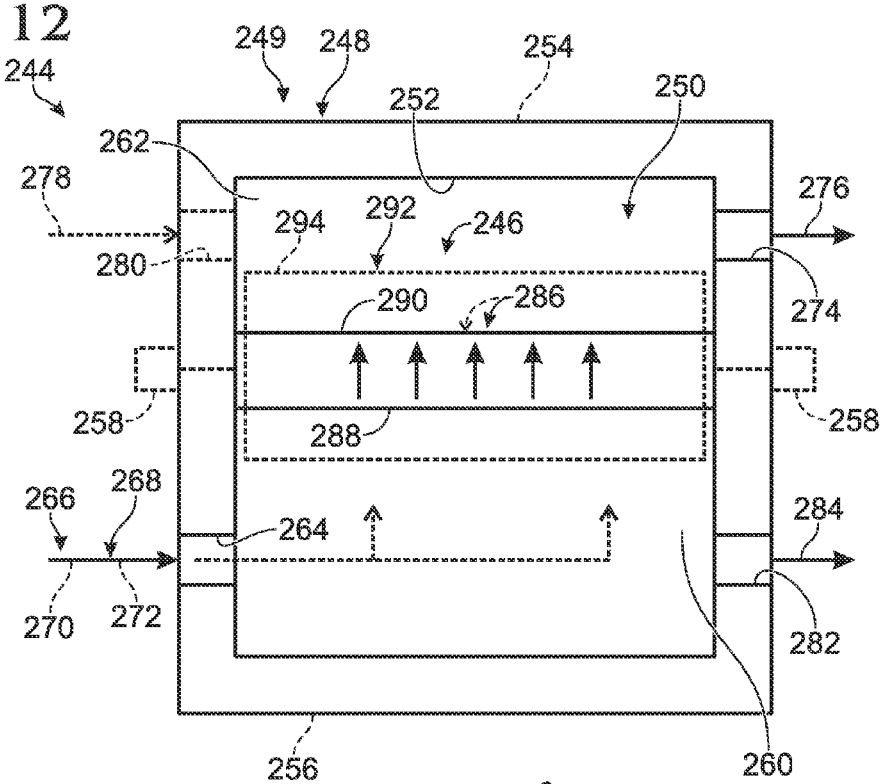
FIG. 12 is a schematic view of a hydrogen purification device of the hydrogen generation assembly of FIG. 1.

An example of a purification region 40 (or hydrogen purification device) of hydrogen generation assembly 20 of FIG. 1 is generally indicated at 244 in FIG. 12. Unless specifically excluded, the hydrogen purification device may include one or more components of the other purification regions described in this disclosure. Hydrogen purification device 40 may include a hydrogen-separation region 246 and an enclosure 248. The enclosure may define an internal volume 250 having an internal perimeter 252. Enclosure 248 may include at least a first portion 254 and a second portion 256 coupled together to form a body 249 in the form of a sealed pressure vessel that may include defined input and output ports. Those ports may define fluid paths by which gases and other fluids are delivered into and removed from the enclosure's internal volume.

First and second portions 254 and 256 may be coupled together using any suitable retention mechanism or structure 258. Examples of suitable retention structures include welds and/or bolts. Examples of seals that may be used to provide a fluid-tight interface between the first and second portions may include gaskets and/or welds. Additionally, or alternatively, first and second portions 254 and 256 may be secured together so that at least a predetermined amount of compression is applied to various components that define the hydrogen-separation region within the enclosure and/or other components that may be incorporated into a hydrogen generation assembly. The applied compression may ensure that various components are maintained in appropriate positions within the enclosure. Additionally, or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 248 may include a mixed gas region 260 and a permeate region 262, as shown in FIG. 12. The mixed gas and permeate region may be separated by hydrogen-separation region 246. At least one input port 264 may be provided, through which a fluid stream 266 is delivered to the enclosure. Fluid stream 266 may be a mixed gas stream 268 that contains hydrogen gas 270 and other gases 272 that are delivered to mixed gas region 260. Hydrogen gas may be a majority component of the mixed gas stream. Hydrogen-separation region 246 may extend between mixed gas region 260 and permeate region 262 so that gas in the mixed gas region must pass through the hydrogen-separation region in order to enter the permeate region. The gas may, for example, be required to pass through at least one hydrogen-selective membrane as discussed further below. The permeate and mixed gas regions may be of any suitable relative size within the enclosure.

Enclosure 248 also may include at least one product output port 274 through which a permeate stream 276 may be received and removed from permeate region 262. The permeate stream may contain at least one of a greater concentration of hydrogen gas and a lower concentration of other gases than the mixed gas stream. Permeate stream 276 may, in some embodiments, include at least initially a carrier, or sweep, gas component, such as may be delivered as a sweep gas stream 278 through a sweep gas port 280 that is in fluid communication with the permeate region. The enclosure also may include at least one byproduct output port 282 through which a byproduct stream 284 containing at least one of a substantial portion of other gases 272 and a reduced concentration of hydrogen gas 270 (relative to the mixed gas stream) is removed from the mixed gas region.

Hydrogen-separation region 246 may include at least one hydrogen-selective membrane 286 having a first or mixed gas surface 288, which is oriented for contact by mixed gas stream 268, and a second or permeate surface 290, which is generally opposed to surface 288. Mixed gas stream 268 may be delivered to the mixed gas region of the enclosure so that is comes into contact with the mixed gas surface of the one or more hydrogen-selective membranes. Permeate stream 276 may be formed from at least a portion of the mixed gas stream that passes through the hydrogen-separation region to permeate region 262. Byproduct stream 284 may be formed from at least a portion of the mixed gas stream that does not pass through the hydrogen-separation region. In some embodiments, byproduct stream 284 may contain a portion of the hydrogen gas present in the mixed gas stream. The hydrogen-separation region also may be configured to trap or otherwise retain at least a portion of the other gases, which may then be removed as a byproduct stream as the separation region is replaced, regenerated, or otherwise recharged.

In FIG. 12, streams 266, 276, 278, and/or 284 may include more than one actual stream flowing into or out of hydrogen purification device 244. For example, the hydrogen purification device may receive a plurality of mixed gas streams 268, a single mixed gas stream 268 that is divided into two or more streams prior to contacting hydrogen-separation region 246, a single stream that is delivered into internal volume 250, etc. Thus, enclosure 248 may include more than one input port 264, product output port 274, sweep gas port 280, and/or byproduct output port 282.

The hydrogen-selective membranes may be formed of any hydrogen-permeable material suitable for use in the operating environment and parameters in which the hydrogen purification device is operated. Examples of hydrogen purification devices are disclosed in U.S. Pat. Nos. 5,997,594 and 6,537,352, the complete disclosures of which are hereby incorporated by reference for all purposes. In some embodiments, the hydrogen-selective membranes may be formed from at least one of palladium and a palladium alloy. Examples of palladium alloys include alloys of palladium with copper, sliver, and/or gold. Examples of various membranes, membrane configuration, and methods for preparing membranes and membrane configurations are disclosed in U.S. Pat. Nos. 6,152,995; 6,221,117; 6,319,306; and 6,537,352, the complete disclosures of which are hereby incorporated by reference for all purposes.

In some embodiments, a plurality of spaced-apart hydrogen-selective membranes 286 may be used in a hydrogen-separation region to form at least a portion of a hydrogen-separation assembly 292. When present, the plurality of membranes may collectively define one or more membrane assemblies 294. In such embodiments, the hydrogen-separation assembly may generally extend from first portion 254 to second portion 256. Thus, the first and second portions may effectively compress the hydrogen-separation assembly. In some embodiments, enclosure 248 may additionally, or alternatively, include end plates (or end frames) coupled to opposite sides of a body portion. In such embodiments, the end plates may effectively compress the hydrogen-separation assembly (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surface of the membranes at a higher pressure than the gases in the permeate region of the hydrogen-separation region. The hydrogen-separation region may, in some embodiments, be heated via any suitable mechanism to an elevated temperature when the hydrogen-separation region is utilized to separate the mixed gas stream into the permeate and byproduct streams. Examples of suitable operating temperatures for hydrogen purification using palladium and palladium allow membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., etc.

Figure 13:
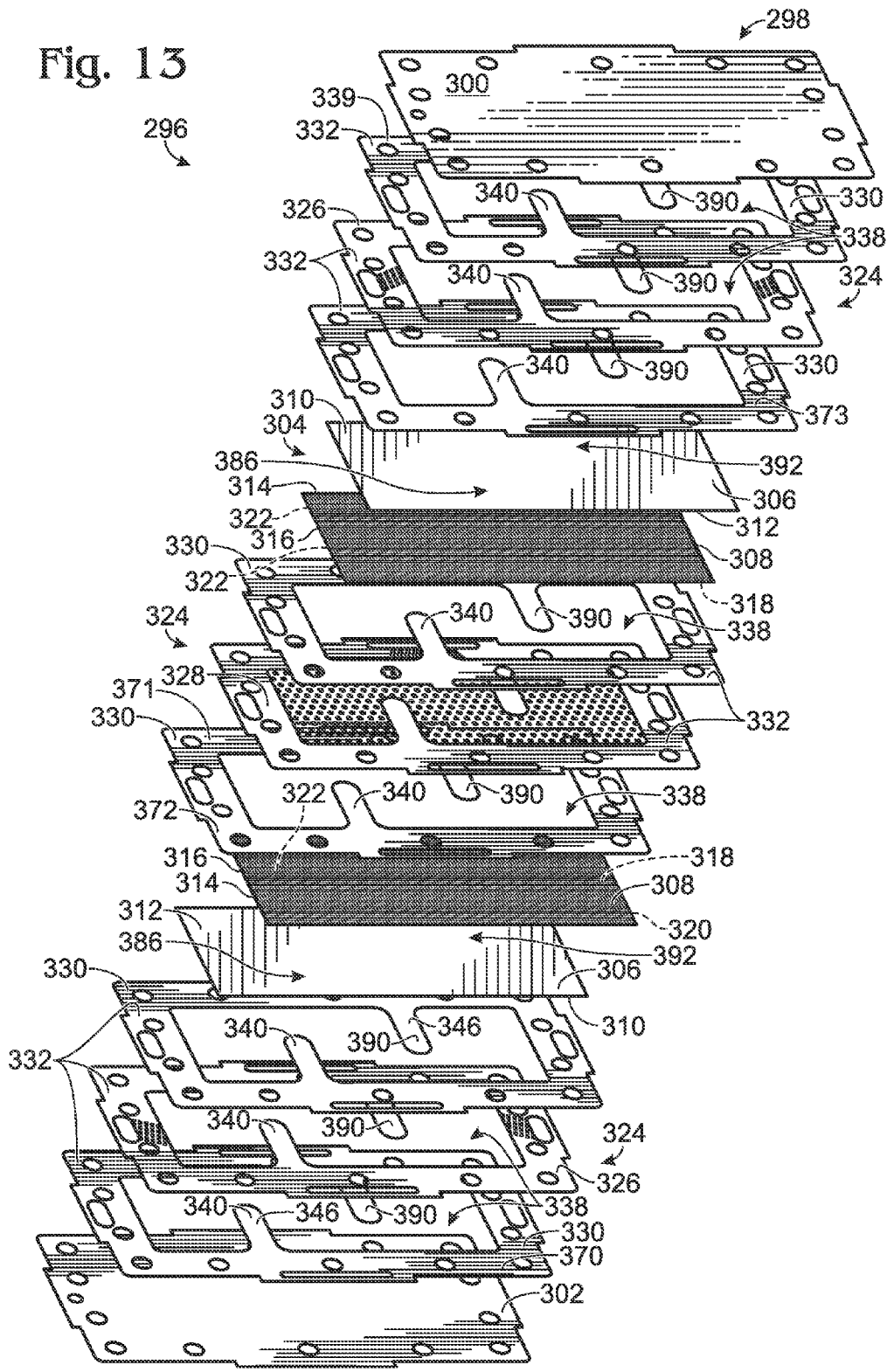
FIG. 13 is an exploded isometric view of an example of the hydrogen purification device of FIG. 12.

An example of hydrogen purification device 244 is generally indicated at 296 in FIG. 13. Unless specifically excluded, hydrogen purification device 296 may include one or more components of other hydrogen purification devices and/or purification regions described in this disclosure. Hydrogen purification device 296 may include a shell or enclosure 298, which may include first end plate or end frame 300 and second end plate or end frame 302. The first and second end plates may be configured to be secured together to define a sealed pressure vessel having an interior compartment 304 in which the hydrogen-separation region is supported. The first and second end plates may include input, output, sweep gas, and byproduct ports (not shown) similar to hydrogen purification device 244.

Hydrogen purification device 296 also may include at least one hydrogen-selective membrane 306 and at least one microscreen structure 308. The hydrogen-selective membrane may be configured to receive at least part of the mixed gas stream from the input port and to separate the mixed gas stream into at least part of the permeate stream and at least part of the byproduct stream. Hydrogen-selective membrane 306 may include a feed side 310 and a permeate side 312. At least part of the permeate stream being formed from the portion of the mixed gas stream that passes from the feed side to the permeate side, with the remaining portion of the mixed gas stream, which remains on the feed side, forming at least part of the byproduct stream. In some embodiments, hydrogen-selective membrane 306 may be secured to at least one membrane frame (not shown), which may then be secured to the first and second end frames.

Microscreen structure 308 may include any suitable structure configured to support the at least one hydrogen-selective membrane. For example, the microscreen structure may include generally opposed surfaces 314 and 316 configured to provide support to permeate side 312, and a plurality of fluid passages 318 extending between the opposed surfaces which allows the permeate stream to flow through the microscreen structure, as shown in FIG. 13. Microscreen structure 308 may include any suitable materials. For example, the microscreen structure may include stainless steel 320 containing an aluminum oxide layer 322 configured to prevent intermetallic diffusion between the stainless steel and the at least one hydrogen-selective membrane.

In some embodiments, the microscreen structure may include stainless steel 303 (Aluminum modified), 17-7PH, 14-8 PH, and/or 15-7 PH. In some embodiments, the stainless steel may include about 0.6 to about 1.5 weight % of Aluminum. The microscreen structure may, in some embodiments, be supported by and/or secured to a non-porous perimeter wall portion or frame (not shown). When the microscreen structure is secured to a non-porous perimeter wall portion, the microscreen structure may be referred to as a "porous central area portion." Examples of other microscreen structures are disclosed in U.S. Patent Application Publication No. 2010/0064887, the complete disclosure of which is hereby incorporated by reference for all purposes.

Hydrogen purification device 296 also may include a plurality of plates or frames 324 disposed between and secured to the first and/or second end frames. The frames may include any suitable structure and/or may be any suitable shape(s), such as square, rectangular, or circular. For example, frames 324 may include a perimeter shell 332 and at least a first membrane support structure 340, as shown in FIG. 13. The perimeter shell may define an open region 338 and a frame plane 339. Additionally, perimeter shell 332 may include first and second opposed sides 370 and 371, and third and fourth opposed sides 372 and 373, as shown in FIG. 13.

Figure 14:
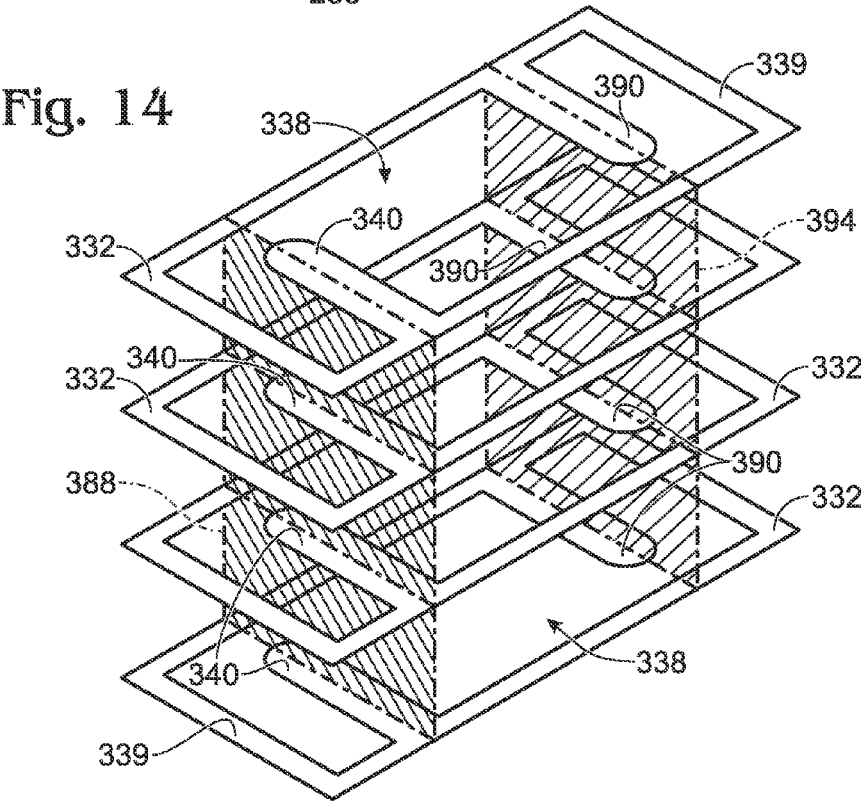
FIG. 14 is a schematic exploded isometric view of the hydrogen purification device of FIG. 13, showing an example alignment of frame projections within membrane support planes.

First membrane support structure 340 may include any suitable structure configured to support a first portion 386 of hydrogen-selective membrane 306, as shown in FIG. 13. For example, the first membrane support structure of the plurality of frames may be co-planar with each other (or with other first membrane support structures of other frames of the plurality of frames) within a first membrane support plane 388 to support first portion 386 of the hydrogen-selective membrane, as shown in FIG. 13 and as schematically demonstrated in FIG. 14. In other words, the first membrane support structure of each frame of the plurality of frames may mirror the first membrane support structure of the other frames of the plurality of frames. The first membrane support plane may have any suitable orientation to frame plane 339. For example, first membrane support plane 388 may be perpendicular to the frame plane, as shown in FIG. 14. Alternatively, the first membrane support plane may intersect but not be perpendicular to frame plane 339.

In some embodiments, frames 324 may include at least a second membrane support structure 390, which may include any suitable structure configured to support a second portion 392 of hydrogen-selective membrane 306, as shown in FIG. 13. For example, the second membrane support structure of the plurality of frames may be co-planar with each other (or with other second membrane support structures of the plurality of frames) within a second membrane support plane 394 to support second portion 392 of the hydrogen-selective membrane, as shown in FIG. 13 and schematically demonstrated in FIG. 14. In other words, the second membrane support structure of each frame of the plurality of frames may mirror the second membrane support structure of the other frames of the plurality of frames. The second membrane support plane may have any suitable orientation to frame plane 339. For example, second membrane support plane 394 may be perpendicular to the frame plane, as shown in FIG. 14. Alternatively, the second membrane support plane may intersect but not be perpendicular to frame plane 339.

Second membrane support structure 390 may have any suitable orientation to first membrane support structure 340. For example, first membrane support structure 340 may extend into open region 338 from first side 370 of perimeter shell 332, while second membrane support structure 390 may extend into the open region from second side 371 (which is opposed from the first side) of the perimeter shell. Alternatively, the first and/or second membrane support structures may extend into the open region from the same side, such as from the first, second, third, or fourth sides of the perimeter shell. In some embodiments, the first and/or second membrane support structures may extend into the open region from the third side and/or fourth side (which is opposed from the third side) of the perimeter shell.

The first and/or second membrane support structures may, for example, be in the form of one or more projections or fingers 346 attached to the perimeter shell and/or formed with the perimeter shell. The projections may extend from the perimeter shell in any suitable direction(s). The projections may be the full thickness of the perimeter shell or may be less than the full thickness of that shell. The projections of each frame of frames 324 may be compressed against the hydrogen-selective membrane thereby locking the membrane in place and reducing the impact of expansion of the hydrogen-selective membrane due to hydrogen dissolution. In other words, the projections of frames 324 may support the hydrogen-selective membrane by being stacked extension(s) of the end frames within the first and/or second membrane support plane. In some embodiments, projection(s) 346 may include one or more receptacles or apertures 352 configured to receive at least one fastener 396 to secure frames 324 to the first and/or second end frames, as shown in FIG. 16.

Frames 324 may include at least one feed frame 326, at least one permeate frame 328, and a plurality of gaskets or gasket frames 330, as shown in FIG. 13. Feed frame 326 may be disposed between one of the first and second end frames and at least one hydrogen-selective membrane 306, or between two hydrogen-selective membranes 306. The feed frame may include a feed frame perimeter shell 398, a feed frame input conduit 334, a feed frame output conduit 336, a feed frame open region 400, at least a first feed frame membrane support structure 402, as shown in FIG. 15. In some embodiments, the feed frame may include at least a second feed frame membrane support structure 404.

The feed frame input conduit may be formed on the feed frame perimeter shell and/or be configured to receive at least part of the mixed gas stream from the input port. Feed frame output conduit 336 may be formed on the feed frame perimeter shell and/or be configured to receive the remaining portion of the mixed gas stream that remains on feed side 310 of hydrogen-selective membrane 306. Feed frame open region 400 may be disposed between the feed frame input and output conduits. Feed frame perimeter shell 398 may include a plurality of grooves or channels 341 fluidly connecting the input and output conduits with the feed frame open region. The channels may be formed on the perimeter shell via any suitable method(s). Additionally, channels 341 may have any suitable orientation(s), such as angled orientations which may induce mixing in feed frame open region 400.

The first and/or second feed frame membrane support structures may include any suitable structure configured to support the first and/or second portions of at least one hydrogen-selective membrane and/or may mirror the first and/or second membrane support structures of other frames, as discussed above. Additionally, the first and/or second feed frame membrane support structures may include any suitable structure configured to change direction of flow of at least part of the mixed gas stream as it flows across the feed frame open region between the input and output conduits. The first and/or second feed frame membrane support structures also may be configured to promote turbulence or mixing within the feed frame open region. For example, without the first and/or second feed frame membrane support structures, flow of at least part of the mixed gas stream across the feed frame open region between the input and output conduits may move in at least a first direction 342. The first and/or second feed frame membrane support structures may be configured to change the flow of at least part of the mixed gas stream from the at least a first direction to at least a second direction 344 that is different from the first direction, as shown in FIG. 15.

The first and/or second feed frame membrane support structures may, for example, be in the form of at least one feed frame projection or finger 406 attached to the feed frame perimeter shell and/or formed with the feed frame perimeter shell. The feed frame projection(s) may extend from the perimeter shell in any suitable direction(s). For example, at least part of the mixed gas stream may flow from the input conduit toward the feed frame open region in generally a third direction 348, while the feed frame projection(s) may extend from the feed frame perimeter shell in a fourth direction 350 that is generally perpendicular to the third direction, such as shown in FIG. 15, and/or generally parallel to the third direction, such as shown in FIG. 16. For example, if the flow of the mixed gas stream from the input conduit toward the feed frame open region is generally in a horizontal direction, the feed frame projection(s) may extend from the feed frame perimeter shell in generally a vertical direction (as shown in FIG. 15) and/or a horizontal direction (as shown in FIG. 16).

In some embodiments, the feed frame projection(s) may be configured to promote flow reversal of the mixed gas stream. For example, at least part of the mixed gas stream may flow from the input conduit toward the feed frame open region generally in third direction 348, while the mixed gas stream may flow into the output conduit from the feed frame open region generally in a fifth direction 351. When the fifth direction is opposite the third direction, then the feed frame projection(s) may be referred to as promoting a flow reversal of the mixed gas stream.

Permeate frame 328 may be positioned such that the at least one hydrogen-selective membrane is disposed between one of the first and second end frames and the permeate frame or between two hydrogen-selective membranes. The permeate frame may include a permeate frame perimeter shell 360, a permeate frame output conduit 362, a permeate frame open region 364, and at least a first permeate frame membrane support structure 366, as shown in FIG. 17. In some embodiments, the permeate frame may include at least a second permeate frame membrane support structure 408.

Output conduit 362 may be formed on permeate frame perimeter shell 360 and/or be configured to receive the permeate stream from permeate frame open region 364 and the hydrogen-selective membrane(s). Perimeter shell 360 may include a plurality of grooves or channels 368 fluidly connecting output conduit 362 with the permeate frame open region. The channels may be formed on perimeter shell 360 via any suitable method(s). Additionally, channels 368 may have any suitable orientation(s), such as angled orientations.

Figure 18:
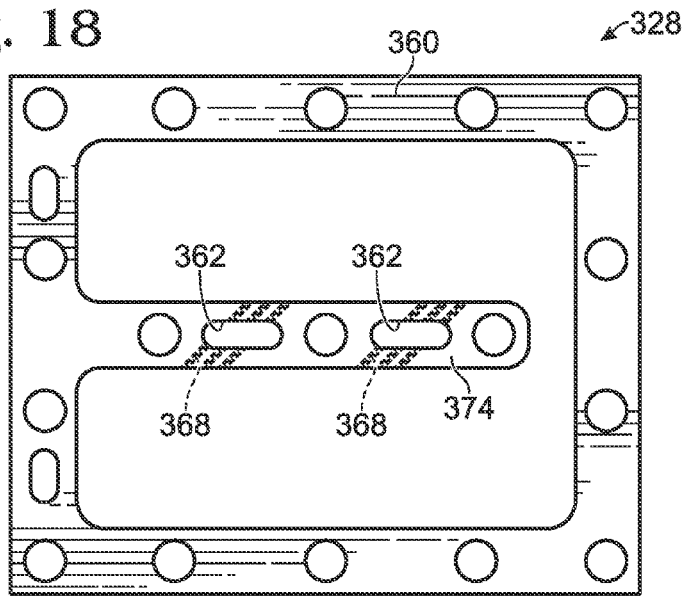
FIG. 18 is a top view of another example of a permeate frame of the hydrogen purification device of FIG. 13.

The first and/or second permeate frame membrane support structures may include any suitable structure configured to support the first and/or second portions of at least one hydrogen-selective membrane and/or may mirror the first and/or second membrane support structures of other frames, as discussed above. The first and/or second permeate frame membrane support structures may, for example, be in the form of at least one projection or finger 374 attached to perimeter shell 360 and/or formed with that shell. The projection(s) may extend from perimeter shell 360 in any suitable direction(s). For example, the projection(s) may extend from the perimeter shell in generally a vertical direction (as shown in FIG. 17) and/or a horizontal direction (as shown in FIG. 18). Projection(s) 374 may be the full thickness of perimeter shell 360 or may be less than the full thickness of that shell. The projections may be compressed against the hydrogen-selective membrane thereby locking the membrane in place and reducing the impact of expansion of the hydrogen-selective membrane due to hydrogen dissolution. In other words, the projection(s) may support the hydrogen-selective membrane by being stacked extension(s) of the first and/or second end frames within the first and/or second membrane support planes.

Projection(s) 374 may include one or more receptacles or apertures 376 configured to receive at least one fastener (not shown) to secure the permeate frame to the first and/or second end frames. In some embodiments, output conduit 362 may be located on one or more of projections 374. In those embodiments, channels 368 may fluidly connect the output conduit with open region 364, as shown in FIG. 18. Because the projections of the frames discussed above extend into open regions, those projections also may be referred to a "constrictions" or "flow constrictions."

Frames 324 also may include gaskets or gasket frames 330, as shown in FIG. 13. The gasket frames may include any suitable structure configured to provide fluid-tight interfaces among the other frames, such as between first and second end plate 300 and 302 and feed frames 326, between feed frames 326 and hydrogen-selective membranes 306, between the hydrogen-selective membranes (and the microscreen structures) and permeate frame 328. An example of a suitable gasket for gasket frames 330 is flexible graphite gaskets. Another example of a suitable gasket material is THERMICULITE® 866 sold by Flexitallic LP (Deer Park, Tex.). Although frames 324 are shown to include two feed frames 326 and a single permeate frame 328, the frames may include any suitable number of feed frames and permeate frames. Additionally, although hydrogen purification device 296 is shown to include two hydrogen-selective membranes 306, the device may include any suitable number of those membranes.

Although frames 324 are shown to include projections that extend only in the vertical direction or only in the horizontal direction, the frames may additionally, or alternatively, include projections that extend in the horizontal, vertical, and/or other suitable directions, such as diagonal, etc. Additionally, although frames 324 are shown to include a single or two projections, the frames may include three, four, five, or more projections. Moreover, although frames 324 are shown to include projections that are co-planar within the first and/or second membrane support planes, the frames may additionally, or alternatively, include projections that are co-planar within third, fourth, fifth or more membrane support planes.

Figure 19:
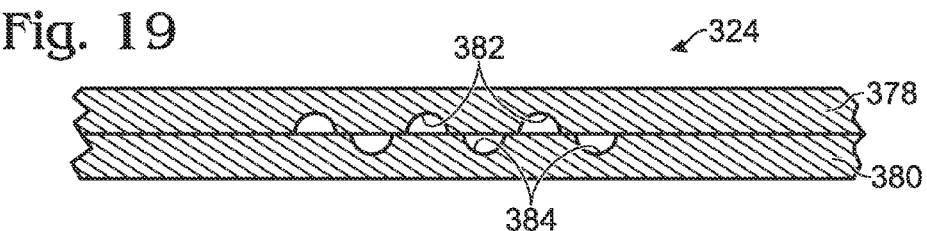
FIG. 19 is a sectional view of the feed frame of FIG. 15 taken along lines 19-19 on FIG. 15.
Figure 20:
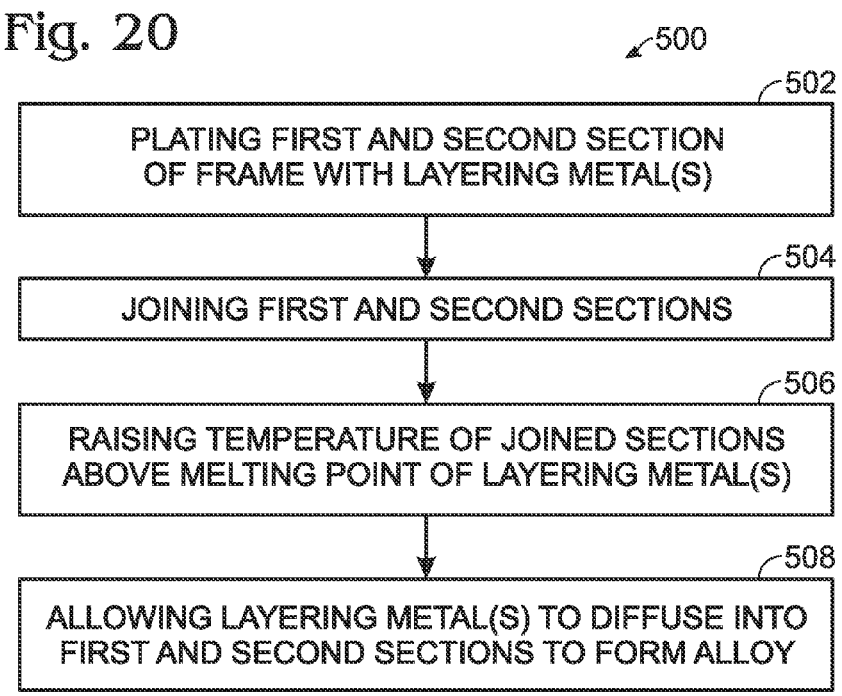
FIG. 20 is a flow chart of an example of a method of manufacturing a frame for a hydrogen purification device.

Frames 324, such as feed frame 326 and/or permeate frame 328, may include any suitable structure. For example, frames 324 may include a first section 378 and a second section 380, as shown in FIG. 19. The first and second sections may be first and second halves of the frame, or may be any suitable portions of that frame. Additionally, the first section may include first channels or first grooves 382, while the second section may include second channels or second grooves 384. The first and second channels may be in any suitable relationship with each other, such as offset from each other. First and second sections 378 and 380 may be joined via any suitable method(s) to form a gas-tight seal between those sections. For example, the first and second sections may be brazed together or gaskets may be used between the sections. Another example of joining the first and second sections (such as part of manufacturing a frame 324) is generally indicated at 500 in FIG. 20. At step 502, the first and second sections may be plated with at least one layering metal having a predetermined melting point. The first and second sections may be made from at least one clad metal, such as copper-clad steel (e.g., copper-clad stainless steel and copper-clad carbon steel). The layering metal may, for example, include tin.

At step 504, the first and second sections may be joined together. In some embodiments, the first section may include first channels (or channel portions) and the second section may include second channels (or channel portions), and joining the first and second sections may include joining those sections such that the first and second channels are facing each other and/or offset from each other. At step 506, temperature of the joined sections may be raised above melting point of the layering metal(s). The liquid layering metal(s) may form an initial seal and/or fill imperfections at the interface between the first and second sections. At step 508, the layering metal(s) may be allowed to diffuse into the first and second sections to form an alloy. The alloy may have a melting point that is higher than the melting point(s) of the layering metal(s). For example, when the first and second sections are copper-clad and the layering metal is tin, the alloy formed may be tin-copper alloy. However, the steps discussed above may be performed in different sequences and in different combinations, not all steps being required for all embodiments of the method.

Hydrogen generation assemblies and/or hydrogen purification devices of the present disclosure may include one or more of the following:

An enclosure supported on an insulation base.

An enclosure including a top portion and/or a bottom portion.

An enclosure including a longitudinal axis.

A vaporization region configured to receive and vaporize at least a portion of at least one liquid-containing feed stream to a vapor feed stream.

A vaporization region contained within an enclosure.

A vaporization region including packing material configured to transfer heat from the heated exhaust stream to at least one liquid-containing feed stream.

A vaporization region including tubing disposed between a heating assembly and a hydrogen-producing region.

Packing material contained within at least a portion of tubing.

Packing material configured to provide a plurality of nucleation sites to promote vaporization of at least a portion of at least one liquid-containing feed stream.

Packing material including a plurality of irregular surfaces that provides at least a portion of the plurality of nucleation sites.

Packing material including a plurality of metallic rods configured to transfer heat from a heated exhaust stream to at least one liquid-containing feed stream.

Plurality of metallic rods including a plurality of portions of at least one of copper wire and aluminum wire.

A hydrogen-producing region containing a reforming catalyst.

A hydrogen-producing region configured to receive at least one feed stream (and/or vapor feed stream) and to produce a reformate stream via a steam reforming reaction.

A hydrogen-producing region contained within an enclosure.

A heating assembly configured to produce a heated exhaust stream for heating a vaporization region to at least a minimum vaporization temperature and/or a hydrogen-producing region to at least a minimum hydrogen-producing temperature.

A heating assembly configured to receive at least one air stream and at least one fuel stream and to combust the at least one fuel stream within a combustion region contained within an enclosure producing a heated exhaust stream for heating at least a hydrogen-producing region to at least a minimum hydrogen-producing temperature.

A heating assembly in thermal communication with a hydrogen-producing region.

A heating assembly including inlets for receiving at least one fuel stream and at least one air stream.

A heating assembly including an igniter assembly configured to ignite at least one fuel stream.

An igniter assembly including a body portion.

An igniter assembly including at least one igniter element attached to a body portion.

An igniter assembly including wires in electrical communication with at least one igniter element and/or at least partially enclosed by a body portion.

A heating assembly including a metal cooling block.

A metal cooling block having at least first and second channels in thermal communication with each other.

A first channel of a metal cooling block receiving at least part of a body portion of an igniter assembly A second channel of a metal cooling block receiving at least part of a conduit.

A metal cooling block having a rectangular cross-section transverse to long axes of first and second channels.

An insulation base configured to reduce external temperature of an enclosure.

An insulation base adjacent to a combustion region.

An insulation base including insulating material and/or at least one passage that extends through insulating material.

At least one passage in fluid communication with a combustion region.

An insulation base including at least one cavity within insulating material.

At least one cavity sized to at least partially receive an air blower configured to produce at least a portion of at least one air stream and/or in fluid communication with at least one passage.

At least one passage including a plurality of passages arranged in a curvilinear and/or circular pattern.

An insulation base adjacent a bottom portion and spaced from a top portion of an enclosure.

A conduit in fluid communication with a hydrogen-producing region and/or through which at least one feed stream is passed prior to delivery to a hydrogen-producing region.

A fuel distribution assembly configured to distribute the at least one fuel stream into a combustion region.

A fuel distribution assembly attached to a bottom portion of an enclosure.

A fuel distribution assembly disposed between a bottom portion of an enclosure and an insulation base.

A base including at least one passage that is in fluid communication with a combustion region.

A mesh assembly supported on a base.

A mesh assembly supported on an insulation base.

A mesh assembly including at least one pathway for at least one fuel stream to flow from a fuel stream distribution region to a combustion region.

A mesh assembly including at least one layer of mesh.

A mesh assembly that extends into a combustion region.

At least one combustion catalyst supported within a combustion region and on a mesh assembly.

At least one combustion catalyst configured to combust hydrogen in the presence of oxygen.

A top wall having a perimeter.

A top wall formed with the enclosure.

At least one side wall having a top portion and a bottom portion.

A top portion of at least one side wall being mounted around a perimeter of a top wall.

A bottom portion of at least one side wall being supported on a mesh assembly

A fuel stream distribution region formed within the at least one side wall and between the top wall and the mesh assembly.

At least one side wall formed with the enclosure.

An inlet into a fuel stream distribution region.

An inlet formed on a top wall.

A fuel stream conduit fluidly connected to an inlet and configured to receive at least one fuel stream.

A fuel stream conduit that goes through a portion of an enclosure.

A fuel stream conduit that extends along a longitudinal axis of an enclosure.

A fuel stream conduit that extends along an axis parallel to but spaced from a longitudinal axis of an enclosure.

A heat conducting assembly external to an enclosure and/or attached to at least a portion of an enclosure.

A heat conducting assembly configured to conduct heat from one or more external heaters attached to the heat conducting assembly to at least a portion of an enclosure.

A heat conducting assembly including a metal band attached to at least a portion of an enclosure.

A metal band that includes aluminum.

One or more external heaters including a total heating surface area that is less (or substantially less) than a heated surface area of at least a portion of an enclosure that is heated by a heat conducting assembly.

First and second end frames including an input port configured to receive a mixed gas stream containing hydrogen gas and other gases.

First and second end frames including an output port configured to receive a permeate stream containing at least one of a greater concentration of hydrogen gas and a lower concentration of other gases than a mixed gas stream.

First and second end frames including a byproduct port configured to receive a byproduct stream containing at least a substantial portion of other gases.

At least one hydrogen-selective membrane disposed between first and second end frames.

At least one hydrogen-selective membrane having a feed side and a permeate side.

At least part of a permeate stream being formed from a portion of a mixed gas stream that passes from a feed side to a permeate side of at least one hydrogen-selective membrane.

A remaining portion of a mixed gas stream that remains on a feed side of at least one hydrogen-selective membrane forms at least part of a byproduct stream.

A plurality of frames disposed between first and second end frames and at least one hydrogen-selective membrane.

A frame including a perimeter shell defining an open region and a frame plane.

At least a first membrane support structure extending into an open region.

At least a first membrane support structure extending into an open region on a first side of a perimeter shell.

First membrane support structures of a plurality of frames being co-planar within a first membrane support plane that is perpendicular to a frame plane to support a first portion of at least one hydrogen-selective membrane.

Each first membrane support structure being co-planar, within a first membrane support plane, with other first membrane support structures of a plurality of frames.

First membrane support plane that is perpendicular to a frame plane of each frame of a plurality of frames.

At least a first membrane support structure including one or more receptacles configured to receive at least one fastener to secure the plurality of frames to first and second end frames.

At least a first membrane support structure formed with the perimeter shell.

At least a second membrane support structure extending into an open region.

At least a second membrane support structure extending into an open region on a second side opposed from a first side of a perimeter shell.

Second membrane support structures of a plurality of frames being co-planar within a second membrane support plane that is spaced from a first membrane support plane and/or perpendicular to a frame plane to support a second portion of at least one hydrogen-selective membrane spaced from the first portion.

Each second membrane support structure being co-planar, within a second membrane support plane, with other second membrane support structures of a plurality of frames.

Second membrane support plane that is perpendicular to a frame plane of each frame of a plurality of frames.

At least a second membrane support structure including one or more receptacles configured to receive at least one fastener to secure the plurality of frames to first and second end frames.

At least one feed frame disposed between at least one of first and second end frames and at least one hydrogen-selective membrane.

At least one feed frame including a feed frame perimeter shell.

At least one feed frame including an input conduit formed on a feed frame perimeter shell and/or configured to receive at least part of a mixed gas stream from an input port.

At least one feed frame including an output conduit formed on a feed frame perimeter shell and/or configured to receive a remaining portion of at least part of a mixed gas stream that remains on a feed side of at least one hydrogen-selective membrane.

At least one feed frame including a feed frame open region disposed between input and output conduits.

At least one feed frame including at least one feed frame membrane support structure within a first membrane support plane.

At least one feed frame membrane support structure being co-planar with at least a first membrane support structure of other frames of a plurality of frames to support a first portion of at least one hydrogen-selective membrane.

At least one feed frame support structure within a second membrane support plane.

At least one feed frame membrane support structure being co-planar with at least a second membrane support structure of other frames of a plurality of frames to support a second portion of at least one hydrogen-selective membrane spaced from a first portion.

At least one feed frame membrane support structure configured to change direction of flow of at least part of a mixed gas steam as the at least part of the mixed gas stream flows across a feed frame open region between input and output conduits.

Without at least one feed frame membrane support structure, flow of the at least part of the mixed gas stream across a feed frame open region between input and output conduits moves in at least a first direction, and the at least one feed frame membrane support structure is configured to change the flow of the at least part of the mixed gas stream from the at least a first direction to at least a second direction different from the at least a first direction.

At least one feed frame membrane support structure including one or more receptacles configured to receive at least one fastener to secure a feed frame to at least one of first and second end frames.

At least one feed frame membrane support structure formed with a perimeter shell.

At least one feed frame membrane support structure that extends from perimeter shell in a fourth direction generally parallel and/or perpendicular to a third direction, where flow of at least part of a mixed gas stream from an input conduit toward a feed frame open region is generally in the third direction.

A feed frame perimeter shell including a plurality of channels fluidly connecting input and output conduits with an open region.

At least one hydrogen-selective membrane disposed between at least one of first and second end frames and at least one permeate frame.

At least one permeate frame including a permeate frame perimeter shell.

At least one permeate frame including an output conduit formed on a permeate frame perimeter shell and/or configured to receive at least part of a permeate stream from at least one hydrogen-selective membrane.

At least one permeate frame including a permeate frame open region surrounded by a permeate frame perimeter shell.

At least one permeate frame including at least one permeate frame membrane support structure within a first membrane support plane.

At least one permeate frame membrane support structure being co-planar with at least a first membrane support structure of other frames of a plurality of frames to support a first portion of at least one hydrogen-selective membrane.

At least one permeate frame membrane support structure within a second membrane support plane.

At least one permeate frame membrane support structure being co-planar with at least a second membrane support structure of other frames of a plurality of frames to support a second portion of at least one hydrogen-selective membrane spaced from the first portion.

At least one permeate frame membrane support structure including one or more receptacles configured to receive at least one fastener to secure a permeate frame to at least one of first and second end frames.

At least one permeate frame membrane support structure formed with a permeate frame perimeter shell.

A microscreen structure configured to support at least one hydrogen-selective membrane.

A microscreen structure including generally opposed surfaces configured to provide support to a permeate side of at least one hydrogen-selective membrane and/or a plurality of fluid passages extending between the opposed surfaces.

A microscreen structure including stainless steel containing an aluminum oxide layer configured to prevent intermetallic diffusion between the stainless steel and at least one hydrogen-selective membrane.

A microscreen structure including stainless steel having about 0.6 to about 1.5 weight percentage of Aluminum.

A microscreen structure including one of 303 (Aluminum modified), 17-7 PH, 13-8 PH, and 15-7 PH stainless steel.

A frame disposed between and secured to at least one of first and second end frames.

A frame including first and second sections.

First and second sections for a frame made from at least one clad metal, such as copper-clad stainless steel and/or copper-clad carbon steel.

First and second sections for a frame plated with at least one layering metal having a metal point, such as tin.

First and second sections for a frame joined together.

First and second sections for a frame joined together and heated to a temperature above melting point of at least one layering metal plated on the first and second sections.

First and second sections for a frame joined together, heated to a temperature above melting point of at least one layering metal plated on the first and second sections.

At least one layering metal being allowed to diffuse into first and second sections such that an alloy is formed with a melting point higher than the melting point of the at least one layering metal.

First and second sections for a frame including first and second channels, respectively.

First and second sections for a frame including first and second channels, respectively.

First and second sections joined such that first and second channels are offset from each other.

INDUSTRIAL APPLICABILITY

The present disclosure, including hydrogen generation assemblies, hydrogen purification devices, and components of those assemblies and devices, is applicable to the fuel-processing and other industries in which hydrogen gas is purified, produces, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A steam reforming hydrogen generation assembly configured to receive at least one feed stream and generate a reformate stream containing hydrogen gas as a majority component and other gases, comprising:
an enclosure having a bottom portion;
a hydrogen-producing region contained within the enclosure and including a reforming catalyst, the hydrogen-producing region being configured to produce, via a steam reforming reaction, the reformate stream from the at least one feed stream;
a heating assembly configured to receive at least one air stream and at least one fuel stream and to combust the at least one fuel stream within a combustion region contained within the enclosure producing a heated exhaust stream for heating at least the hydrogen-producing region to at least a minimum hydrogen-producing temperature; and
a fuel distribution assembly attached to the bottom portion of the enclosure and configured to distribute the at least one fuel stream into the combustion region, the fuel distribution assembly including:
- a base including at least one passage that is in fluid communication with the combustion region,
- a mesh assembly supported on the base,
- a top wall having a perimeter,
- at least one side wall having a top portion and a bottom portion, the top portion being mounted around the perimeter and the bottom portion being supported on the mesh assembly such that a fuel stream distribution region is formed within the at least one side wall and between the top wall and the mesh assembly,
- an inlet into the fuel stream distribution region, and
- a fuel stream conduit fluidly connected to the inlet and configured to receive the at least one fuel stream, wherein the mesh assembly includes at least one pathway for the at least one fuel stream to flow from the fuel stream distribution region to the combustion region.

2. The assembly of claim 1, wherein the mesh assembly extends into the combustion region, the heating assembly further comprising at least one combustion catalyst supported within the combustion region via the mesh assembly, the at least one combustion catalyst configured to combust hydrogen in the presence of oxygen.

3. The assembly of claim 1, wherein the inlet is formed on the top wall and the fuel stream conduit goes through a portion of the enclosure.

4. The assembly of claim 1, wherein the enclosure defines a longitudinal axis, and the fuel stream conduit extends along the longitudinal axis.

5. The assembly of claim 4, wherein the enclosure includes a longitudinal axis, and the fuel stream conduit extends along an axis parallel to but spaced from the longitudinal axis.

6. The assembly of claim 4, wherein at least one of the top wall and the at least one side wall is formed with the enclosure.

7. The assembly of claim 1, wherein the mesh assembly includes at least one layer of mesh.

8. The assembly of claim 1, further comprising a heat conducting assembly external to the enclosure and attached to at least a portion of the enclosure, the heat conducting assembly being configured to conduct heat from one or more external heaters attached to the heat conducting assembly to the at least a portion of the enclosure.

* * * * *